(12) United States Patent
Stross

(10) Patent No.: US 10,766,550 B2
(45) Date of Patent: Sep. 8, 2020

(54) LOAD DIVIDER DOLLY WITH ACTIVE PITCH ANGLE ADJUSTMENT FOR ON-THE-FLY LOAD DISTRIBUTION

(71) Applicant: Lawrence Stross, Fort Saskatchewan (CA)

(72) Inventor: Lawrence Stross, Fort Saskatchewan (CA)

(*) Notice: Subject to any disclaimer, the term of this patent is extended or adjusted under 35 U.S.C. 154(b) by 190 days.

(21) Appl. No.: 15/986,791

(22) Filed: May 22, 2018

(65) Prior Publication Data
US 2019/0359272 A1    Nov. 28, 2019

(51) Int. Cl.
*B62D 61/12*    (2006.01)
*B62D 43/02*    (2006.01)
*B62D 53/04*    (2006.01)
*B62D 43/00*    (2006.01)

(52) U.S. Cl.
CPC ......... *B62D 61/125* (2013.01); *B62D 43/002* (2013.01); *B62D 43/02* (2013.01); *B62D 53/04* (2013.01)

(58) Field of Classification Search
CPC ...... B62D 43/02; B62D 43/002; B62D 53/04; B62D 61/125
USPC ...................................... 280/407.1
See application file for complete search history.

(56) References Cited

U.S. PATENT DOCUMENTS

| 3,282,601 A | 11/1966 | Harbers | |
| 3,713,663 A * | 1/1973 | Granning | B60G 9/003 280/124.109 |
| 3,746,363 A * | 7/1973 | Borns | B60G 3/14 280/86.751 |
| 4,063,779 A | 12/1977 | Martin et al. | |
| 4,252,340 A * | 2/1981 | Egging | B62D 61/125 280/6.16 |
| 4,314,709 A * | 2/1982 | Silbernagel | B60G 17/052 280/405.1 |
| 4,501,437 A * | 2/1985 | Becker | B62D 61/125 180/209 |
| 4,783,096 A | 11/1988 | Ramsey et al. | |
| 5,192,101 A | 3/1993 | Richardson | |

(Continued)

FOREIGN PATENT DOCUMENTS

CN    106103147    9/2017
DE    102006019779    10/2007
(Continued)

OTHER PUBLICATIONS

Lindsay, Automatic air suspension control system, a vehicle traction control system and traction methods, English machine translation of CN patent No. 106103147, 11 pages.
(Continued)

*Primary Examiner* — Kevin Hurley
*Assistant Examiner* — Felicia L. Brittman
(74) *Attorney, Agent, or Firm* — Robert A. Nissen

(57) ABSTRACT

A load divider dolly has: a chassis; ground engaging wheels; a tow vehicle mount pivotally mounted to the chassis; a variable volume element mounted to adjust a pitch angle between the chassis and the tow vehicle mount; and a pressure control system configured to, during use, supply and exhaust fluid such as gas to and from the variable volume element to distribute load between a tow vehicle and the ground engaging wheels of the load divider dolly.

13 Claims, 19 Drawing Sheets

(56) References Cited

U.S. PATENT DOCUMENTS

| | | | |
|---|---|---|---|
| 5,458,355 | A | 10/1995 | Young |
| 5,540,454 | A | 7/1996 | VanDenberg et al. |
| 5,549,322 | A | 8/1996 | Hauri |
| 5,823,629 | A | 10/1998 | Smith et al. |
| 6,062,578 | A | 5/2000 | Richardson |
| 6,189,901 | B1 | 2/2001 | Smith et al. |
| 6,247,712 | B1 | 6/2001 | Smith et al. |
| 6,398,236 | B1 | 6/2002 | Richardson |
| 6,416,136 | B1 * | 7/2002 | Smith .................. B60B 35/003 301/124.1 |
| 6,419,247 | B1 | 7/2002 | Moran |
| 6,478,317 | B2 * | 11/2002 | Konop .................... B60G 7/02 280/86.5 |
| 6,523,625 | B2 | 2/2003 | Eberling et al. |
| 7,731,208 | B2 | 6/2010 | Strong |
| 8,523,203 | B1 | 9/2013 | Strong et al. |
| 9,475,355 | B2 | 8/2016 | Layne et al. |
| 9,598,126 | B2 | 3/2017 | Strong et al. |
| 2004/0056441 | A1 | 3/2004 | Chalin |
| 2007/0126196 | A1 | 6/2007 | Klahn |
| 2009/0205883 | A1 | 8/2009 | Strong |
| 2009/0322047 | A1 | 12/2009 | Mitchell |
| 2017/0225729 | A1 | 8/2017 | Yakimishyn |
| 2017/0267043 | A1 | 9/2017 | Strong et al. |

FOREIGN PATENT DOCUMENTS

| | | |
|---|---|---|
| EP | 0238891 | 9/1987 |
| GB | 1290682 | 9/1972 |
| GB | 2116924 | 10/1983 |

OTHER PUBLICATIONS

WABCO, Air Suspension: OptiRide, product website, excerpt taken from internet archive at http://www.wabco-auto.com/products/category-type/air-suspension/chassis-air-suspension/optiride, available at least as early as Dec. 16, 2017, 2 pages.

TrailerToad.com, excerpt taken from internet archive https://web.archive.org/web/20180304163211/http://trailertoad.com/, available at least as early as Mar. 4, 2018, 8 pages.

* cited by examiner

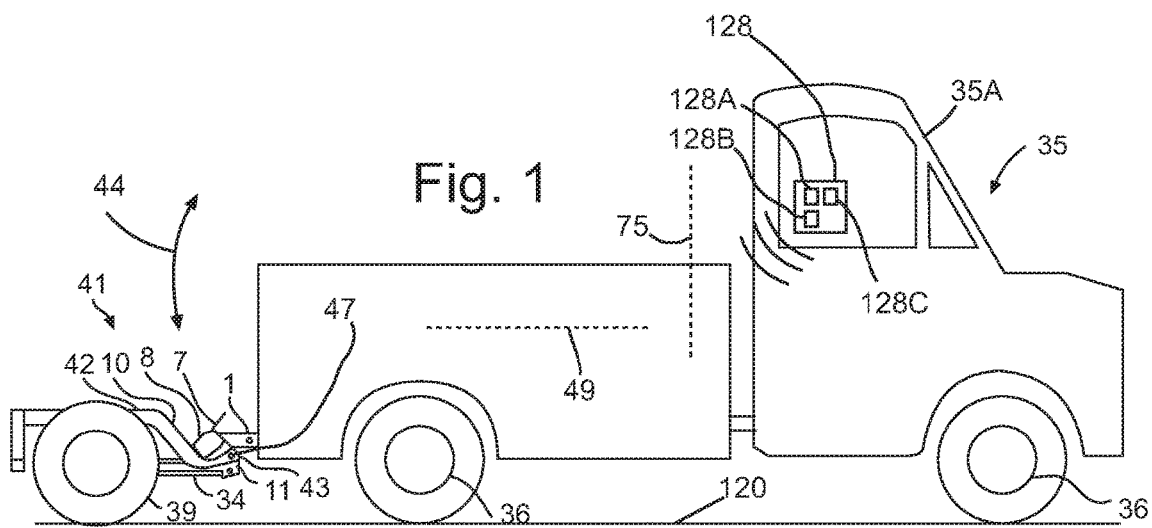
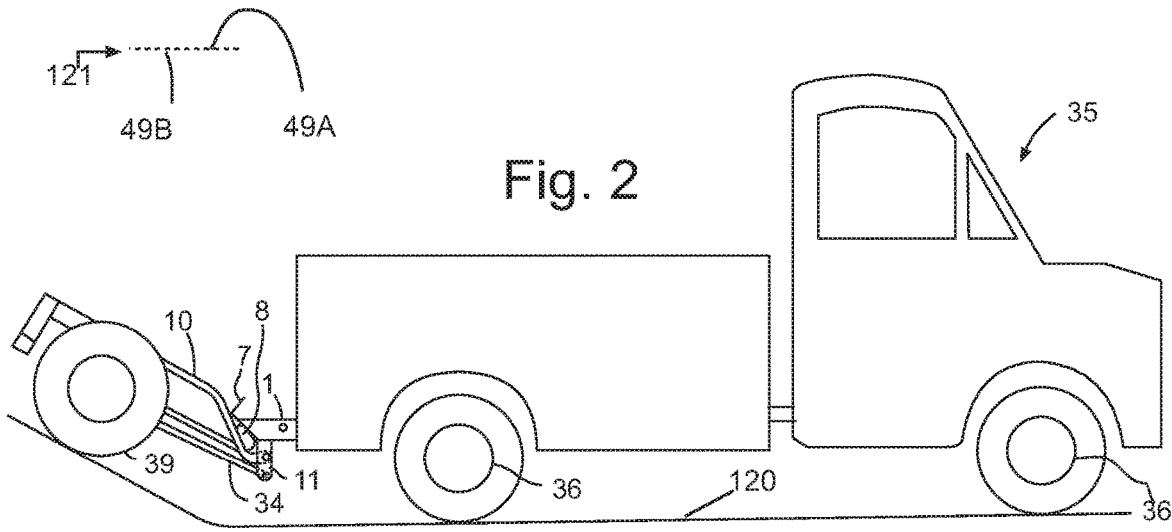
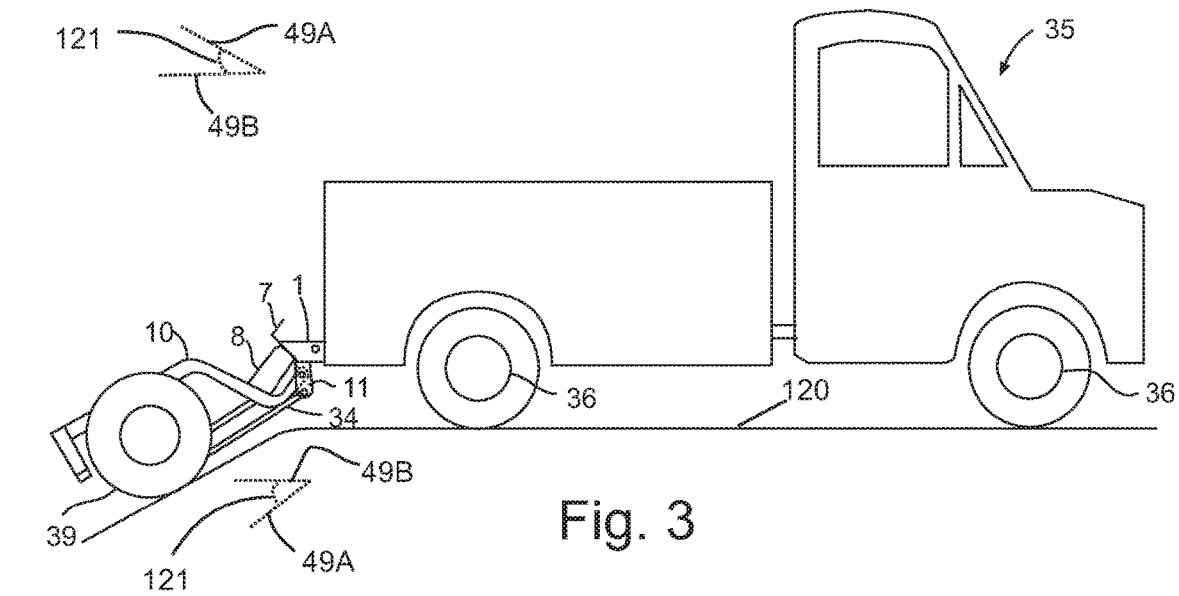

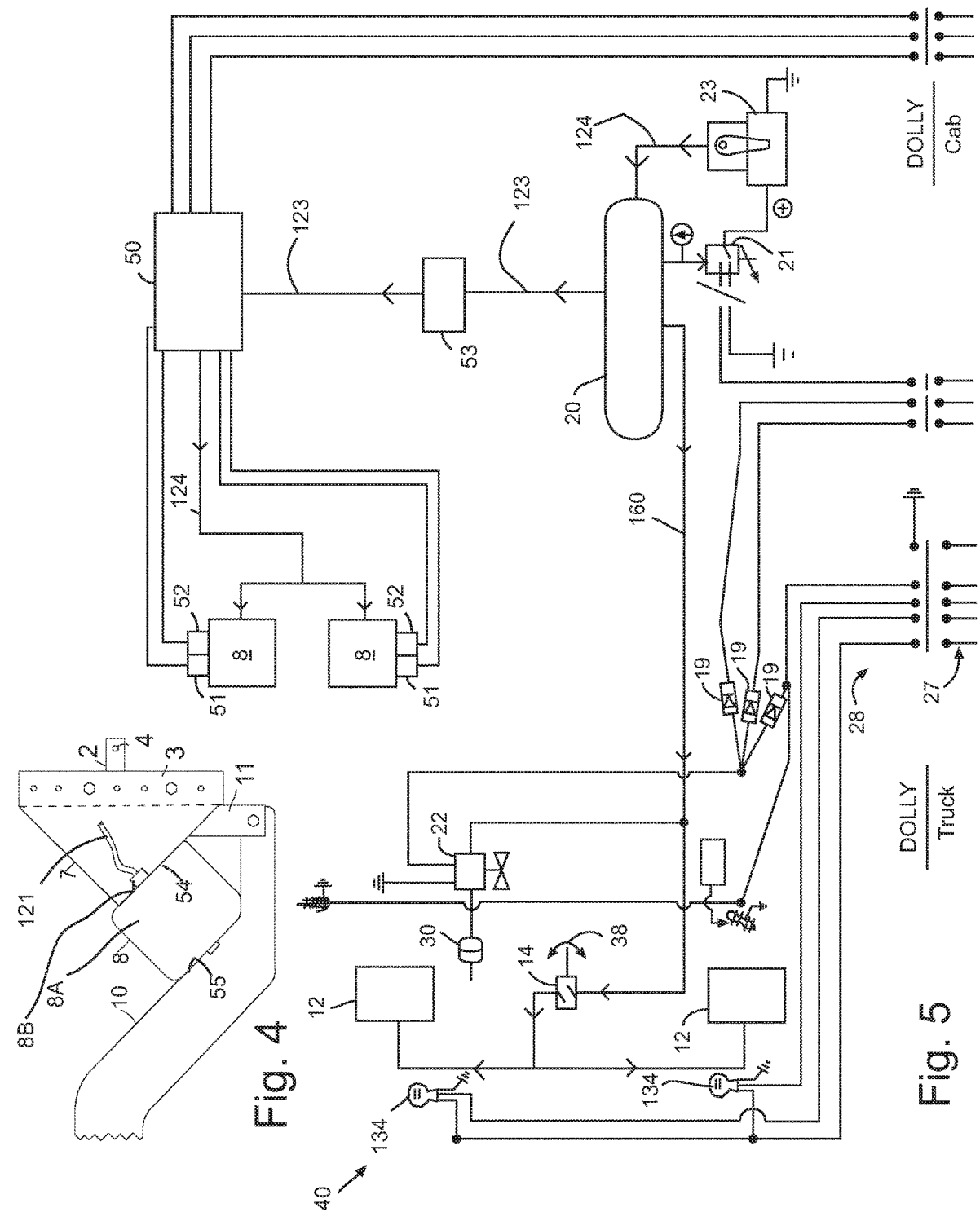

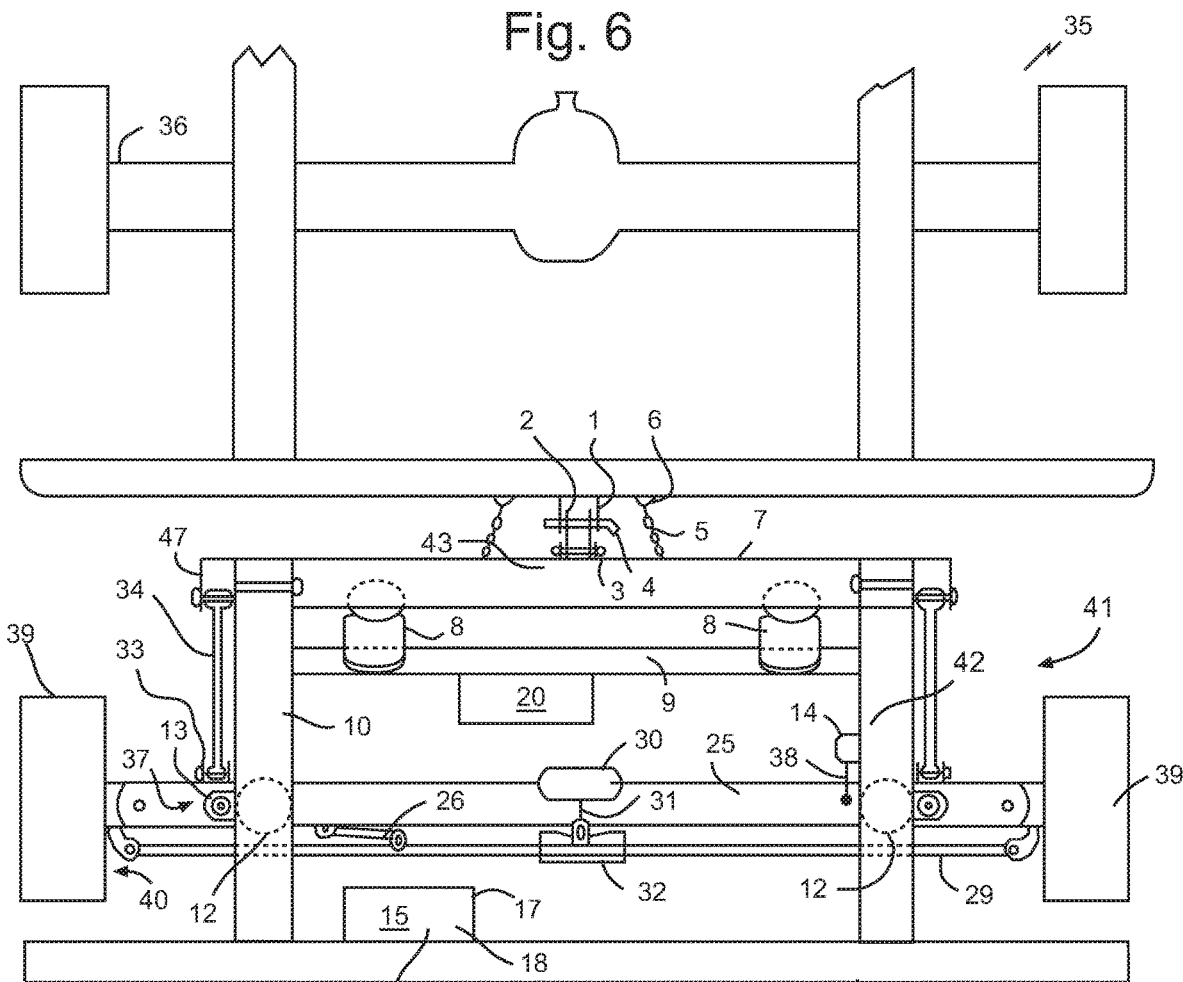
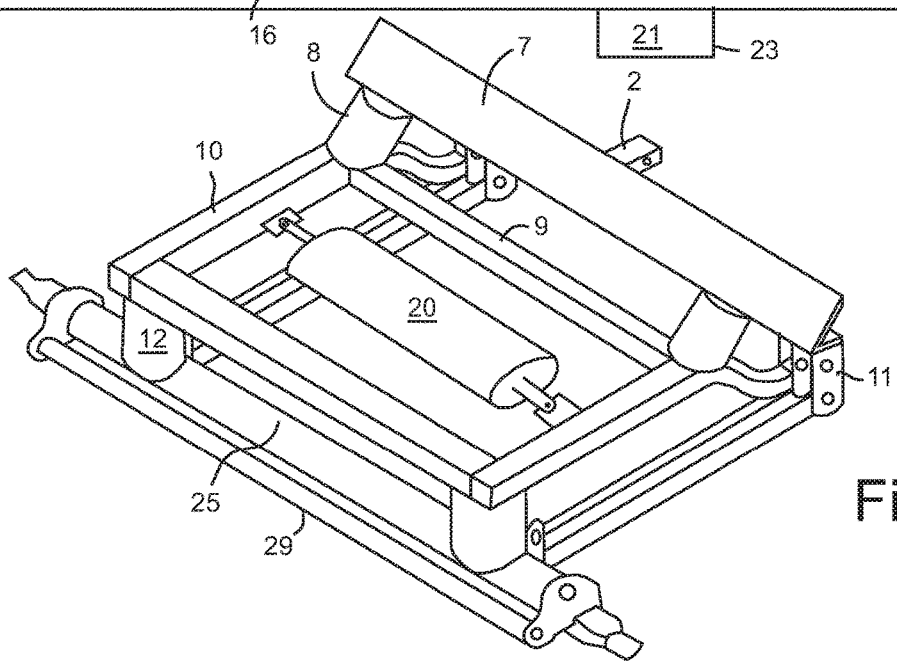

LOAD DIVIDER DOLLY WITH ACTIVE PITCH ANGLE ADJUSTMENT FOR ON-THE-FLY LOAD DISTRIBUTION

TECHNICAL FIELD

This document relates to load divider dollies for use with tow vehicles.

BACKGROUND

A load-carrying vehicle may be a truck or trailer unit, such as a dump or pickup truck. Such a vehicle may incorporate a tag axle at a rear end of the vehicle to increase a maximum payload rating of the truck or trailer, and to improve safety while driving the vehicle along a road surface. Some tag axles are retractable or otherwise liftable off the ground surface when not in use. Some tag axles incorporate shock absorbers. Some tag axles pivot when advancing through a valley or cresting a hill.

SUMMARY

A load divider dolly is disclosed comprising: a chassis; ground engaging wheels; a tow vehicle mount pivotally mounted to the chassis; a variable volume element mounted to adjust a pitch angle between the chassis and the tow vehicle mount; and a pressure control system configured to, during use, supply and exhaust fluid such as gas to and from the variable volume element to distribute load between a tow vehicle and the ground engaging wheels of the load divider dolly.

A method is disclosed comprising: advancing a tow vehicle over a ground surface, in which a load divider dolly is connected to a rear end of the tow vehicle, the load divider dolly having: a chassis pivotally mounted to the tow vehicle; a variable volume element mounted to adjust a pitch angle between the chassis and the tow vehicle; and wheels mounted to the chassis and engaging the ground surface; while advancing the tow vehicle, supplying and exhausting gas to the variable volume element to distribute load between a tow vehicle and the ground engaging wheels of the load divider dolly.

An apparatus is disclosed comprising: a tow vehicle; and a load divider dolly comprising: a chassis pivotally connected to the chassis to permit the chassis to pitch up and down; ground engaging wheels; a variable volume element mounted to adjust a pivot angle between the chassis and the tow vehicle; and a pressure control system configured to, during use, supply and exhaust fluid to and from the variable volume element to distribute load between the tow vehicle and the ground engaging wheels.

A load divider dolly is disclosed comprising: a tow vehicle connector; ground engaging wheels; a chassis pivotally connected to the tow vehicle connector to permit the chassis to pitch up and down relative to the tow vehicle connector; an air bag supported between the chassis and the tow vehicle connector; and a pressure control system configured to maintain a pressure in the air bag within a predetermined range by reducing and increasing the pressure in the air bag when the pressure in the air bag is above or below the predetermined range, respectively.

A load divider dolly is disclosed comprising: a tow vehicle connector; ground engaging wheels; a chassis pivotally connected to the tow vehicle connector to permit the chassis to pitch up and down relative to the tow vehicle connector; a gas-filled shock absorber mounted between the chassis and the tow vehicle connector; and a pressure control system configured to, during use, adjust a gas pressure within the gas-filled shock absorber to balance loading between the ground engaging wheels of the load divider dolly and a set of ground engaging wheels on the tow vehicle.

In various embodiments, there may be included any one or more of the following features: The pressure control system is configured to maintain, during use, a pressure in the variable volume element within a predetermined range by reducing and increasing the pressure in the variable volume element when the pressure in the variable volume element is above or below the predetermined range, respectively. The pressure control system is configured to adjust the predetermined range during use. The pressure control system is configured to set the predetermined range based on a load carried by the tow vehicle. The pressure control system is configured to set the predetermined range based on the variable volume element being in a neutral intermediate expansion state. A position sensor, which is connected to the pressure control system and configured to detect the neutral intermediate expansion state. The position sensor comprises a pitch angle sensor. The variable volume element is mounted between planar surfaces, with one of the planar surfaces forming part of the tow vehicle mount and another of the planar surfaces forming part of the chassis. The neutral intermediate expansion state corresponds to a parallel orientation of the planar surfaces. A control device configured to be operated by a user to instruct the pressure control system to set the predetermined range. The control device is mounted within a cab of a tow vehicle connected to tow the load divider dolly. The control device is configured to be operated by the user to instruct the pressure control system to one or more of: set the predetermined range when the tow vehicle is in an unloaded state; and set the predetermined range when the tow vehicle is in a loaded state. The control device is configured to be operated by the user to instruct the pressure control system to: place the variable volume element in an off mode. A pressure sensor, which is connected to the pressure control system and configured to detect pressure in the variable volume element. The variable volume element comprises a gas-filled bag. The gas-filled bag comprises an air bag. An air compressor and an air tank connected to supply air pressure to the variable volume element. The pressure control system is configured to at least partially exhaust pressure from the variable volume element to the atmosphere to reduce pressure in the variable volume element. The pressure control system comprises a processor and a computer readable medium storing operating logic instructions. A shock absorber mounted between the chassis and the ground engaging wheels. The shock absorber is maintained by the pressure control system. The tow vehicle mount comprises a hitch connector. An apparatus comprising: a tow vehicle; and a load divider dolly connected to the tow vehicle. Mounting the load divider dolly to a tow vehicle. Driving a tow vehicle having connected thereto the load divider dolly. Supplying and exhausting gas to the variable volume element further comprises: exhausting gas from the variable volume element while the load divider dolly and tow vehicle traverse a section of ground surface corresponding to a positive rate of slope change; and supply gas to the variable volume element while the load divider dolly and tow vehicle traverse a section of ground surface corresponding to a negative rate of slope change. Supplying and exhausting gas to the variable volume element further comprises maintaining, during use, a pressure in the variable volume element within a predetermined range. Setting the predetermined range corresponding to the variable volume element having a neutral intermediate expansion state while the load divider dolly and tow vehicle are on a horizontal ground surface. The pressure control device comprises a pressure regulator. the pressure control device comprises a plurality of pressure control devices that are each set to a pressure range that corresponds to one of: a) an empty load pressure range; b) a light load pressure range; or c) a heavy load pressure range. The predetermined range may be relatively small, for example 1-5 psi. The plurality of pressure control devices is coupled to a switch that allows a user to choose between: a) an empty load setting corresponding to the empty load pressure range; b) a light load setting corresponding to the light load pressure range; and c) a heavy load setting corresponding to the heavy load pressure range. An axle mounting the ground engaging wheels. One or more air suspension bags mounted between the chassis and the axle. One or more torque arms pivotally connected to the axle and the chassis to maintain a caster angle of the ground engaging wheels. The axle further comprises: pivotal portions on either end of the axle that mount to the ground engaging wheels; and a steerable axle connected to the pivotal portions of the axle. The axle comprises a steerable axle lock; the steerable axle comprises a lock receiving part; and the steerable axle lock engages the lock receiving part due to signals from a user. The signals are caused by reversing the load divider dolly, when brakes are applied or when switched on. The dolly is a tag axle. The element 8 is filled with liquid or gas.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a side view of a load divider dolly secured to a tow vehicle on a horizontal road surface.

FIG. 2 is a side view of the load divider dolly and the tow vehicle of FIG. 1 traversing a road dip.

FIG. 3 is a side view of the load divider dolly and the tow vehicle of FIG. 1 cresting a hill.

FIG. 4 is a side elevation view of a portion of a chassis of the load divider dolly of FIG. 1 illustrating the variable volume element.

FIG. 5 is a schematic diagram of a pressure control system configured to regulate pressure in the variable volume elements of the load divider dolly of FIG. 1.

FIG. 6 is a top plan view of a load divider dolly and a rear portion of a tow vehicle.

FIG. 7 is a perspective view of a load divider dolly of FIG. 1 with ground engaging wheels omitted.

DETAILED DESCRIPTION

Figure 8:
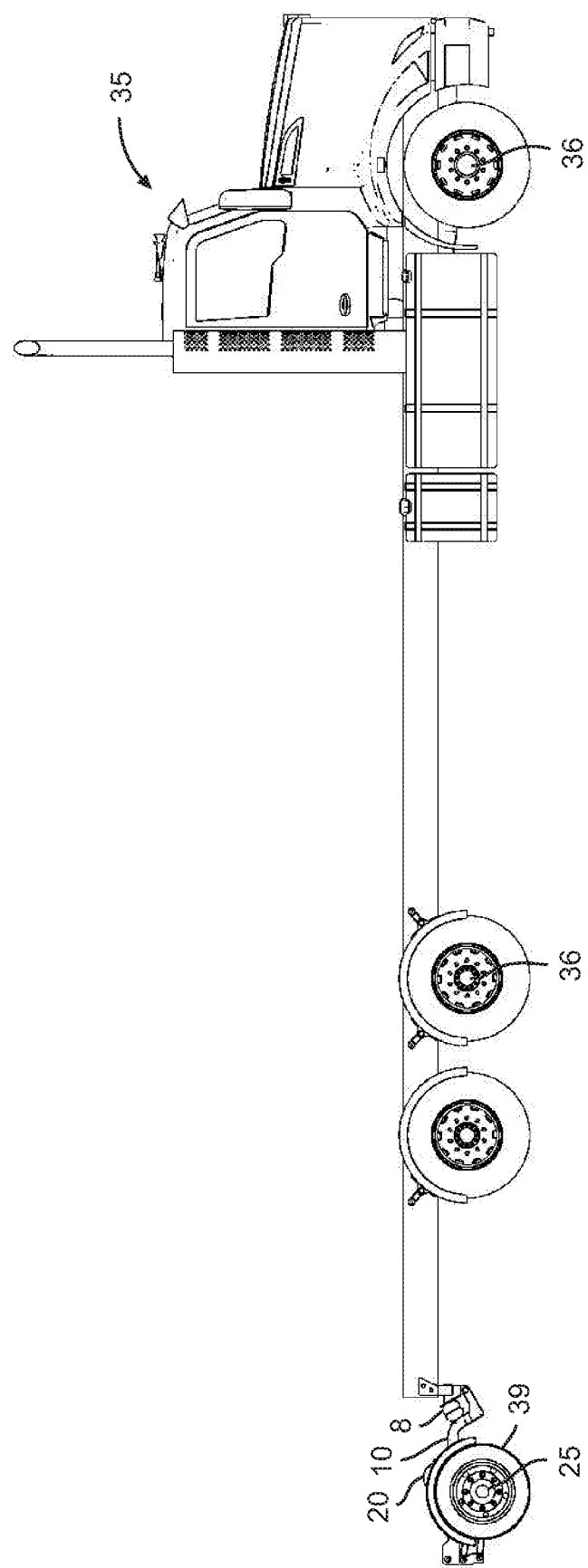
FIG. 8 is a side elevation view of an embodiment of a load divider dolly secured to a tow vehicle, in this case a tractor trailer.

Immaterial modifications may be made to the embodiments described here without departing from what is covered by the claims.

Payload-carrying motor vehicles such as dump trucks are limited in their payload-carrying capacity by various factors, for example the load capacity of their respective supporting axles and related components including suspension and tires, as well as government regulations. Such factors may have an impact on the economical use of a payload-carrying motor vehicle in that the more payload the vehicle can carry, the more profitable the use of the vehicle is.

An approach to increasing payload capacity is to add one or more pusher axles. A pusher axle is an auxiliary axle positioned forward of a drive axle. A pusher axle may be suspended in a retractable manner to permit a vehicle operator to deploy such axle as needed to aid in supporting the vehicle while extending the life of the wheels of same when not required.

Another approach to increasing payload capacity is to add a tag axle. A tag axle is a load bearing auxiliary axle located behind a drive axles, such as a remote distance behind the vehicle itself. A tag axle may be suspended from the rear end of a vehicle's frame and upon vehicle operator command, configured to extend or retract into and out of contact with the ground surface. In moving the tag axle into a retracted or inactive mode, the tag axle may be raised and stored above the rear end of the vehicle body. In moving the tag axle into an extended or active mode the tag axle may be lowered into contact with the ground surface behind the vehicle frame or chassis.

A tag axle distributes a vehicle's total weight over a relatively broader footprint, allowing the vehicle to meet weight-imposed restrictions on certain roads. When a truck passes over a set of roadside scales, such scales weigh the vehicle and determine the amount of weight that is supported by each axle. The weight distribution can be manipulated by various methods. The position of the trailer's mounting point on the truck can be moved ahead or back to disperse the weight forward or backward, and the trailer axles can often be slid forward or back for the same results. Under one approach, an air pressure is set and used to deploy the tag axle, forcing the tag axle tires to bear against a road surface to aid in supporting the vehicle and thus relieve some of the weight being supported by the other axles. By using a relatively greater pressure of air, the tag axle takes on a greater percentage of the load's weight. By using a relatively lower pressure of air, the driver can decrease the weight-carrying capacity of the axle or eliminate it completely by raising the tag axle up and off of the road.

A dolly includes an unpowered, towed vehicle designed for connection to a tractor unit, truck or other prime mover vehicle with strong traction power. Like a tag axle, a dolly may be lifted or deployed via regulation of air pressure in an air bag suspension system, regulation of pressurized hydraulic fluid in a hydraulic system, or other suitable methods. A tag axle is an example of a dolly. A dolly may form a semi or full trailer depending on the number of wheel axles.

Referring to FIGS. 1 and 5-6, a load divider dolly 41 is illustrated comprising a chassis 42, ground engaging wheels 39, a variable volume element 8, and a pressure control system 50 (FIG. 5). Referring to FIG. 1, the chassis may be pivotally mounted to the tow vehicle 35 in use, for example by incorporation of a tow vehicle connector or mount 43 that is pivotally connected to the chassis 42, for example to permit the chassis 42 to pitch up and down such as in directions 44. The mount 43 may mount rigidly, for example fixed, against relatively motion, at least about a pitch axis 47, which in the example shown is defined by a hinge connection between the mount 43 and the chassis 42. Pitch refers to movement about a pitch axis 47 that is perpendicular to both a yaw axis 75 and a longitudinal axis 49 defined by the tow vehicle 35 and/or the dolly 41. Yaw and/or roll of the chassis relative to the tow vehicle 35/mount 43 may be permitted by the structure of the dolly 41. Referring to FIGS. 1-3, the variable volume element 8, such as an expandable and compressible fluid-filled element, may be mounted to adjust a pivot or pitch angle 121 between the chassis 42 and the tow vehicle mount 43. The pitch angle refers to the angle 121 between the longitudinal axis 49A of the dolly chassis 42 and the longitudinal axis 49B of the vehicle 35. For illustration purposes, the axis 49A-B in FIGS. 2-3 are transposed to respective blank areas of the page. In FIG. 1, the pitch angle 121 is zero, in FIG. 2 the angle is positive and in FIG. 3 the angle is negative. The pressure control system 50 may be configured to, during use, supply and exhaust fluid, such as a gas, to and from the variable volume element 8, for example to distribute load between a tow vehicle 35 and the ground engaging wheels 39 of the load divider dolly 41.

Referring to FIGS. 5-7, the load divider dolly 41 may comprise a suitable pneumatic system for adjusting the pitch angle of the dolly 41. The variable volume element 8 may comprise a gas-filled bag, for example an air bag. Referring to FIG. 4, the bag or element 8 may be formed by a bladder 8A, with a fluid inlet 8B, and supplied via a supply and exhaust line 124. Referring to FIGS. 5-7, the load divider dolly 41 may comprise an air compressor 23 and an air tank 20, for example connected to supply air pressure to the variable volume element 8. As shown, more than one element 8 may be present, for example two elements 8 as shown or more. Pressure control system 50 may be an analog control system or may incorporate digital control such as using a processor and computer readable medium. Examples of the latter (processor and computer readable medium) include a microprocessor (microcontroller), a programmable logic control (PLC), a computer, or other type of controller. Air may be supplied to line 124 from tank 20 via lines 123 through system 50. Compressor 23 may be activated by an air pressure switch 21 that may be set to instruct the compressor 23 to fill tank 20 to a predetermined range of air pressure. A typical switch 21 may be used to set a maximum and minimum fill pressure, for example if the pressure in tank 20 drops below the minimum the tank 20 is filled to the maximum level and then the compressor 23 shuts off. Control for the system 50 and various other parts, such as switch 21 or compressor 23 may be provided by suitable mechanisms, such as on-unit controls, including buttons. Referring to FIGS. 1 and 5, suitable controls, such as controls 128A-C, may be provided to remotely access and control the system 50 or various parts of the dolly 41, for example by remote such as using a control device 128 in the cab 35A of the vehicle 35. Control may be provided by wired (FIG. 5) or wireless (FIG. 1) methods, with the latter including the use of suitable communication frequencies such as radio, including WIFI™ or BLUETOOTH™ control.

Referring to FIGS. 1-3 and 5, the pressure control system 50 (FIG. 5) may be configured to achieve load balancing by maintaining a pressure in the variable volume element 8. For example, bag pressure may be maintained within a predetermined range, for example by reducing and increasing the pressure in the variable volume element 8 when the pressure in the variable volume element 8 is above or below the predetermined range, respectively. Thus, referring to FIG. 1, a predetermined range of twenty to twenty-five psi (pounds per square inch) may be selected depending on the load carried by the tow vehicle 35. In other examples the predetermined range is a specific pressure, such as twenty five psi. Referring to FIG. 2, during travel the vehicle 35 may traverse sections of road or ground surface 120 corresponding to valleys or hills, experiencing a positive rate of slope change as a result. A positive rate of slope change means the grade is increasing. In such cases, the positive rate of slope change will initially cause a relative increase of loading on the ground engaging wheels 39 of the dolly 41, coupled with a relative decrease of loading on the tow vehicle 35, causing the wheels 39 to pivot up relative to the vehicle 35, compressing the element 8. The compression of element 8 thus increases the pressure in element 8, and once the pressure rises above the maximum pressure in the predetermined range, the system 50 responds by exhausting gas from the variable volume element 8. By exhausting gas, the pressure in element 8 decreases, reducing the downward force through wheels 39 to transfer loading from the wheels 39 to the vehicle 35, balancing the distribution of load of the vehicle 35.

Referring to FIG. 3, the opposite reaction occurs when vehicle 35 traverses, for example advances over, a section of road or ground surface 120 corresponding to the cresting of a hill or a descent, experiencing a negative rate of slope change as a result. A negative rate of slope change means the grade is decreasing. In such cases, the negative rate of slope change will initially cause a relative decrease of loading on the ground engaging wheels 39 of the dolly 41, coupled with a relative increase of loading on the tow vehicle 35, causing the wheels 39 to pivot down relative to the vehicle 35, expanding the element 8. The expansion of element 8 thus decreases the pressure in element 8, and once the pressure falls below the minimum pressure in the predetermined range, the system 50 responds by supplying gas to the variable volume element 8. By supplying gas, the pressure in element 8 rises, pressing wheels 39 down to transfer loading from the vehicle 35 to the wheels 39, balancing the distribution of the load of the vehicle 35.

Figure 20:
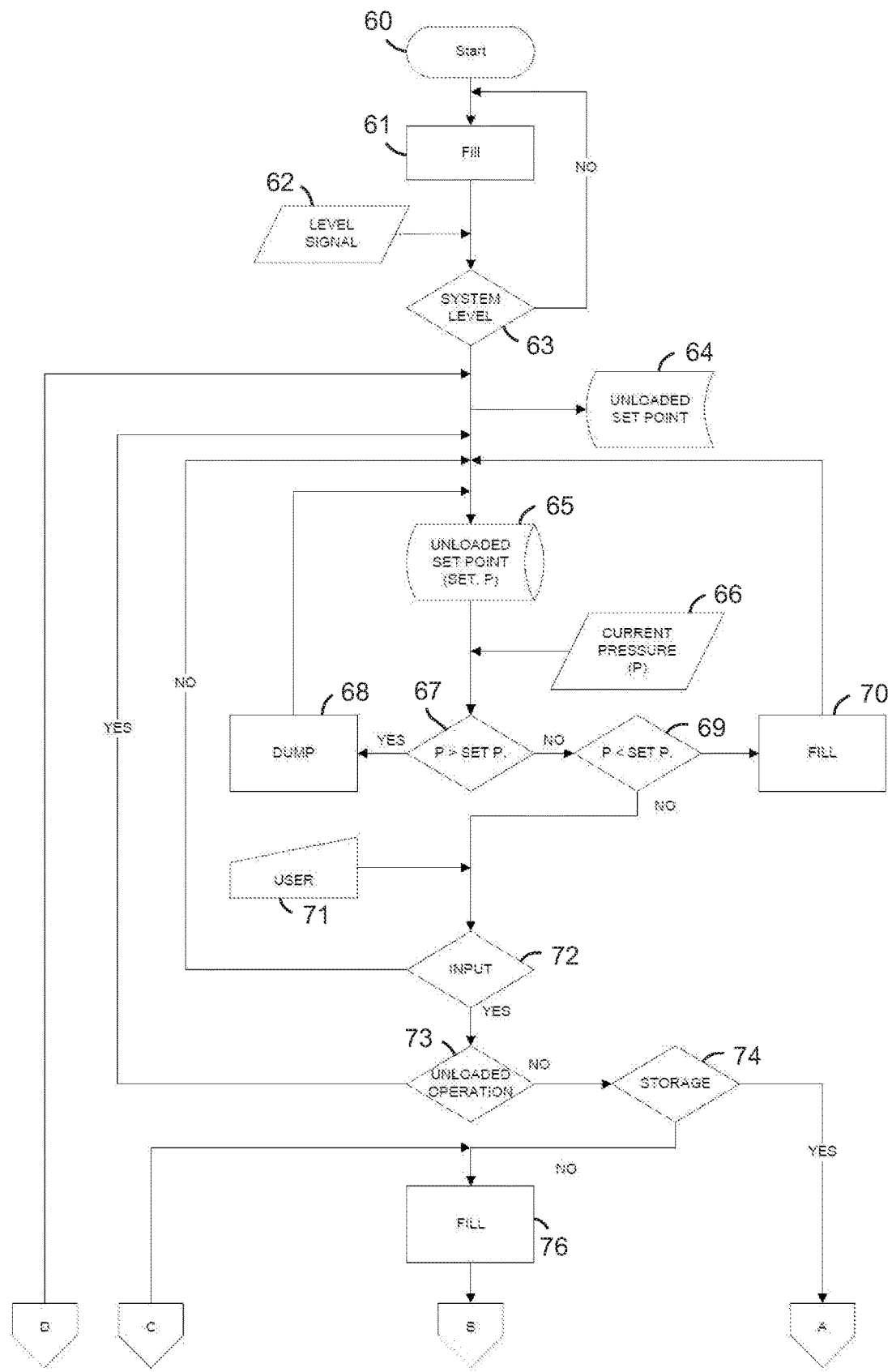
FIGS. 20-22 collectively form a logic flow chart for regulating air pressure in a variable volume element.
Figure 21:
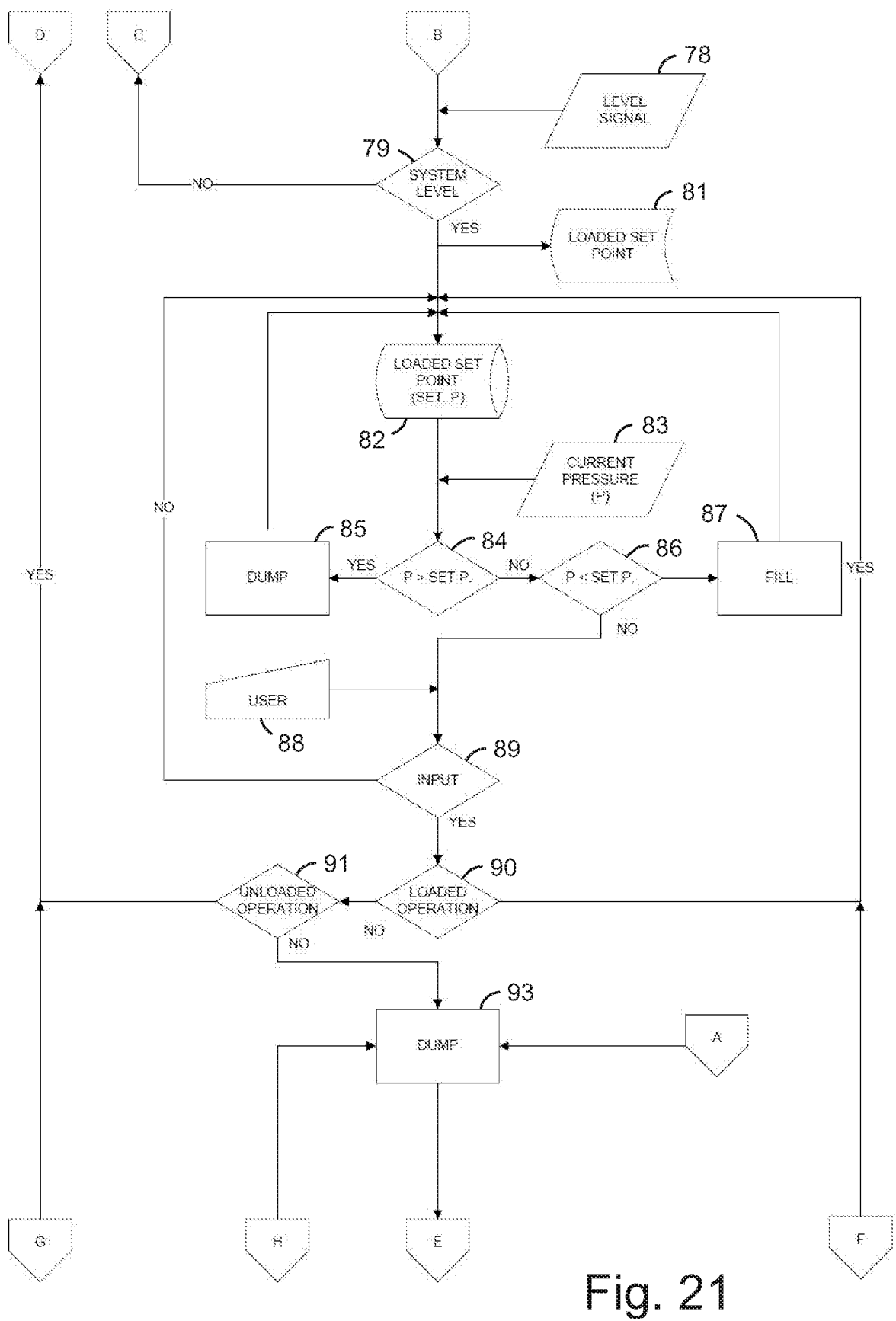
Figure 22:
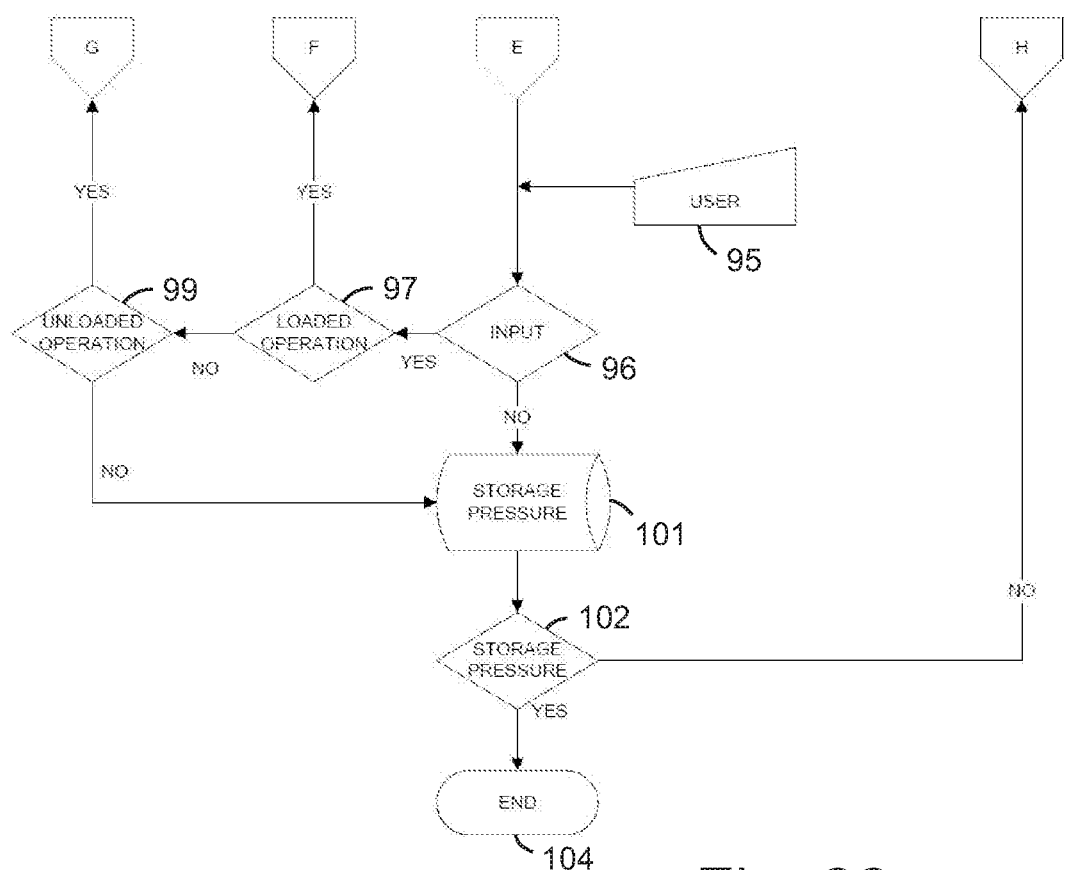

Referring to FIGS. 20-22, a logic flow chart is provided to illustrate the setting and regulation of air pressure in the variable volume element 8. Such charts comprise various symbols used to indicate different types of actions or steps, as well as lines and arrows used to indicate the sequence of such actions or steps, and the relationships between them. A rounded rectangle symbolizes the beginning or end of a program flow. A rectangle with four straight sides at right angles symbolizes a processing function. A rectangle with a concave curved side and a convex curved side symbolizes stored data. A parallelogram symbolizes data of any type. A diamond symbolizes a decision point between two or more paths. A cylinder symbolizes data that is directly accessible. A right trapezoid symbolizes data that is inputted manually. A pentagon symbolizes an outgoing off-page reference. Matching pentagons on different figure pages indicate process flow across same.

Referring to FIGS. 5 and 20, the pressure control system 50 may be configured to adjust the predetermined range during use, for example in accordance with an air regulation process. The load divider dolly 41 and the tow vehicle 35 may be connected to one another via the tow vehicle mount 43 and positioned on a flat or horizontal surface prior to initiating the air regulation process. The air regulation process may begin with a start process step 60, which may be initiated by pressing an on button, such as button 128C, using a control device such as remote control 128 (FIG. 1). At the start process step 60, system 50 may activate the air compressor 23 via an electric air pressure switch 21. The electric air pressure switch 21 may be connected to and powered by a suitable power source such as lines or receptacles 27 from the cab of the vehicle 35, or in other cases via a battery, onboard generator, or a solar panel. The air compressor 23 may supply air into the air tank 20 until the tank is pressurized to a preselected pressure.

Referring to FIGS. 5 and 20, the pressure control system 50 may be configured to set the predetermined range based on a load carried by the tow vehicle 35. For example the system 50 may set the predetermined range based on the variable volume element 8 being in a neutral intermediate expansion state, for further example while loaded or unloaded. The load divider dolly 41 may comprise a position sensor 52 configured to detect the neutral intermediate expansion state, for example by monitoring a relative position between the chassis 42 and the tow vehicle mount 43, in which the neutral state is determined based on signals, for example in the form of level signal data 62 continually or incrementally supplied from the position sensor 51 to controller or system 50. At a fill step 61, the air tank may supply air into variable volume element 8. The process may be initiated by the user operating the control device 128 to start. As the pressurized air tank 20 fills the variable volume element 8 with air, position sensor 51 may periodically or continuously send the level signal data 62 to the pressure control system 50. At a system level decision step 63, the pressure control system 50 may determine whether the variable volume element 8 is in the neutral intermediate expansion state based on the level signal data 62. The air tank 20 is maintained at a higher pressure than the elements 8 in order to permit the tank 20 to readily fill the elements 8 when desired. When a pressure in the air tank 20 drops below a threshold, the system turns on the compressor and re-pressurizes the air tank 20.

Referring to FIGS. 1, 5 and 20, the position sensor 51 may comprise an angle sensor configured to detect the pivot or pitch angle 121 between the chassis 42 and the tow vehicle mount 43. The angle sensor may be positioned at the hinge that defines the pitch axis 47, or at another suitable location. In some cases the angle sensor is a proximity sensor that detects a particular condition indicative of the neutral intermediate expansion state. The variable volume element 8 may be mounted between planar surfaces, such as plates 54 and 55, with one plate, for example plate 54, mounted to the tow vehicle mount 43 and the other plate, for example plate 55, mounted to the chassis 42, and the variable volume element 8 mounted between the plates 54 and 55. The neutral expansion state may be detected upon the position sensor 51 detecting a parallel orientation of the pair of plates 54 and 55. Detection may refer to the fact that signals sent to system 50 are interpreted by system 50 as indicating a particular state. Using a parallel orientation for a neutral state, which the dolly 41 will assume when advancing on a horizontal ground surface 120, reduces wear and tear on element 8 by minimizing the subjection of element 8 to pressure points experienced during of parallel plate orientations.

Referring to FIGS. 5 and 20, the load divider dolly 41 may comprise a pressure sensor 52 configured to detect, and send signals to the pressure control system 50 indicating pressure in the variable volume element 8. If the pressure control system 50 determines that the variable volume element 8 is in the neutral intermediate expansion state, then the pressure control system 50 may store the air pressure level in the variable volume element 8, for example as unloaded set point data 64, which is re-fed back into the process as unloaded set point 65.

Referring to FIGS. 5 and 20, a user may begin driving the tow vehicle 35 following storage of the unloaded set point data 64. Once the set point data 64 is set, the system 50 may enter an active state where the system 50 continually or periodically checks to see if pressure in the element 8 needs adjusting. While the tow vehicle 35 is being driven, the pressure control system 50 may receive current pressure data 66 from the pressure sensor 52. At a pressure comparison step 67, the pressure control system 50 may determine whether the current air pressure in the variable volume element 8 is greater than the unloaded set point air pressure.

If the current air pressure in the variable volume element 8 is greater than the unloaded set point air pressure, for example when then the tow vehicle 35 traverses a valley such that the tow vehicle 35 is at a lower elevation than the load divider dolly 41 as illustrated in FIG. 2, the pressure control system 50 will initiate a dump step 68 in which air is released from the variable volume element 8. The pressure control system 50 may be configured to at least partially exhaust pressure, for example to atmosphere, from the variable volume element 8 to the atmosphere to reduce pressure in the variable volume element 8. Exhausting may cease once the pressure in the element or elements 8 is no longer greater than the set point.

If the current air pressure in the variable volume element 8 is not greater than the unloaded set point air pressure, then the pressure control system 50 may determine whether the current air pressure in the variable volume element 8 is less than the unloaded set point air pressure, for example at a pressure comparison step 69. If yes, for example when the tow vehicle 35 traverses a hill crest such that the tow vehicle 35 is at a higher elevation than the load divider dolly 41 as illustrated in FIG. 3, then the pressure control system 50 will initiate a fill step 70 in which air is supplied to the variable volume element 8 to increase the pressure. If no, then the pressure control system 50 may check for manual user input data 71 and restart the loop at point 65 if no user input was detected.

Referring to FIGS. 5 and 20, the pressure control system 50 may be configured to set the predetermined range based on a load carried by the tow vehicle 35. The load divider dolly 41 may comprise a control device 128 configured to be operated by a user to send control signals, for example in the form of manual user input data 71, to the pressure control system 50 to set the predetermined range. The control device 128 may be mounted within a cab 35A of the tow vehicle 35. The control device 128 may be configured to be operated by the user to send one or more of the following control signals to the pressure control system 50: a) set predetermined range when the tow vehicle 35 is in an unloaded state, for example as discussed above with button 128B; and b) set predetermined range when the tow vehicle 35 is in a loaded state, for example at a storage decision step 74, for example using button 128C to initiate.

At an input decision step 72, the pressure control system 50 may determine whether it has received manual user input data 71. If no, the pressure comparison step 67 may be reinitiated. If yes, at an unloaded operation decision step 73, the pressure control system 50 may determine whether the manual user input data 71 has signals to set the predetermined air pressure range of the variable volume element 8 based on the tow vehicle 35 being in the unloaded state. If yes, then the pressure comparison step 67 may be reinitiated. If no, then the pressure control system 50 assumes the vehicle 35 has a load and the predetermined range of pressure in the element 8 requires monitoring and potential adjustment. System 50 may determine whether the manual user input data 71 has signals to set the predetermined air pressure range of the variable volume element 8 based on the tow vehicle 35 being in a storage state (such as an off or prepare to shut off mode). Referring to FIGS. 20-22, if yes, then the pressure control system 50 may initiate a dump step 93, in which air is releases from the variable volume element 8 (FIG. 21). If no, then the pressure control system 50 may initiate a fill step 76 in which air is supplied to the variable volume element 8.

Referring to FIGS. 5 and 21, under the loaded state, the pressure control system 50 may receive level signal data 78 from the position sensor 52. At a system level decision step 79, the pressure control system 50 may determine whether the variable volume element 8 is in the neutral intermediate expansion state based on the level signal data 78. If no, the pressure control system 50 may reinitiate the fill step 76. If yes, the pressure control system 50 will store air pressure level signals from the pressure sensor 52 as loaded set point data 81 or accessible loaded set point data 82. The pressure control system 50 may then maintain air pressure in the variable volume element 8 within a predetermined range in a manner similar to that used to maintain air pressure within a predetermined range under the unloaded state, for example with current pressure data 83, pressure comparison step 84, dump step 85, pressure comparison step 86, fill step 87, manual user input data 88, and input decision step 89 corresponding to the current pressure data 66, the pressure comparison step 67, the dump step 68, pressure comparison step 69, fill step 70, manual user input data 71, and input decision step 72, respectively. In some cases the system can operate with relatively fewer initiate set point controls, such as by offering a single set pressure point control that loops through either the process shown in FIG. 20 or the process shown in FIG. 21 with respect to monitoring and adjusting pressure on the fly. The adjustment of gas pressure may be advantageous due to how responsive gas is, permitting fast and continuous pressure adjustment as the chassis 42 traverses the ground surface 120.

Referring to FIGS. 5 and 21, at a loaded operation decision step 90, the pressure control system 50 may determine whether the manual user input data 88 has signals to set the predetermined air pressure range of the variable volume element 8 based on the tow vehicle 35 being in the loaded state. If yes, the pressure control system 50 may reinitiate the pressure comparison step 84. If no, then the pressure control system 50 may determine whether the manual user input data 88 has signals to set the predetermined air pressure range of the variable volume element 8 in the unloaded state, for example at an unloaded operation decision step 91. If yes, then the pressure control system 50 may reinitiate the pressure comparison step 67 (FIG. 20). If no, then the pressure control system 50 may initiate the dump step 93.

Referring to FIGS. 5 and 22, following completion of the dump step 93, the pressure control system 50 may determine if it has received any manual user input data 95, for example at an input decision step 96. If yes, the control system 50 will determine whether the manual user input data 95 has signals to set the predetermined air pressure range of the variable volume element 8 in the loaded state, for example at a loaded operation decision step 97. If no, the pressure control system 50 will access storage pressure data 101, and determine whether the current pressure is equal to the storage pressure, for example, which may comprise to a non-zero pressure setting designed to avoid damaging the element 8 or dolly when the system 50 is not in use. If yes, the pressure control system 50 may initiate an end process step 104. If no, the system may dump the pressure via dump step 93. Referring to FIGS. 5 and 22, the control device 128 may be configured to be operated by the user to send one or more of the following control signals to the pressure control system 50: place the variable volume element or elements 8 in an off mode. If no, the pressure control system 50 may reinitiate the dump step 93. 97→99, 99→100, 99→101.

Figure 9:
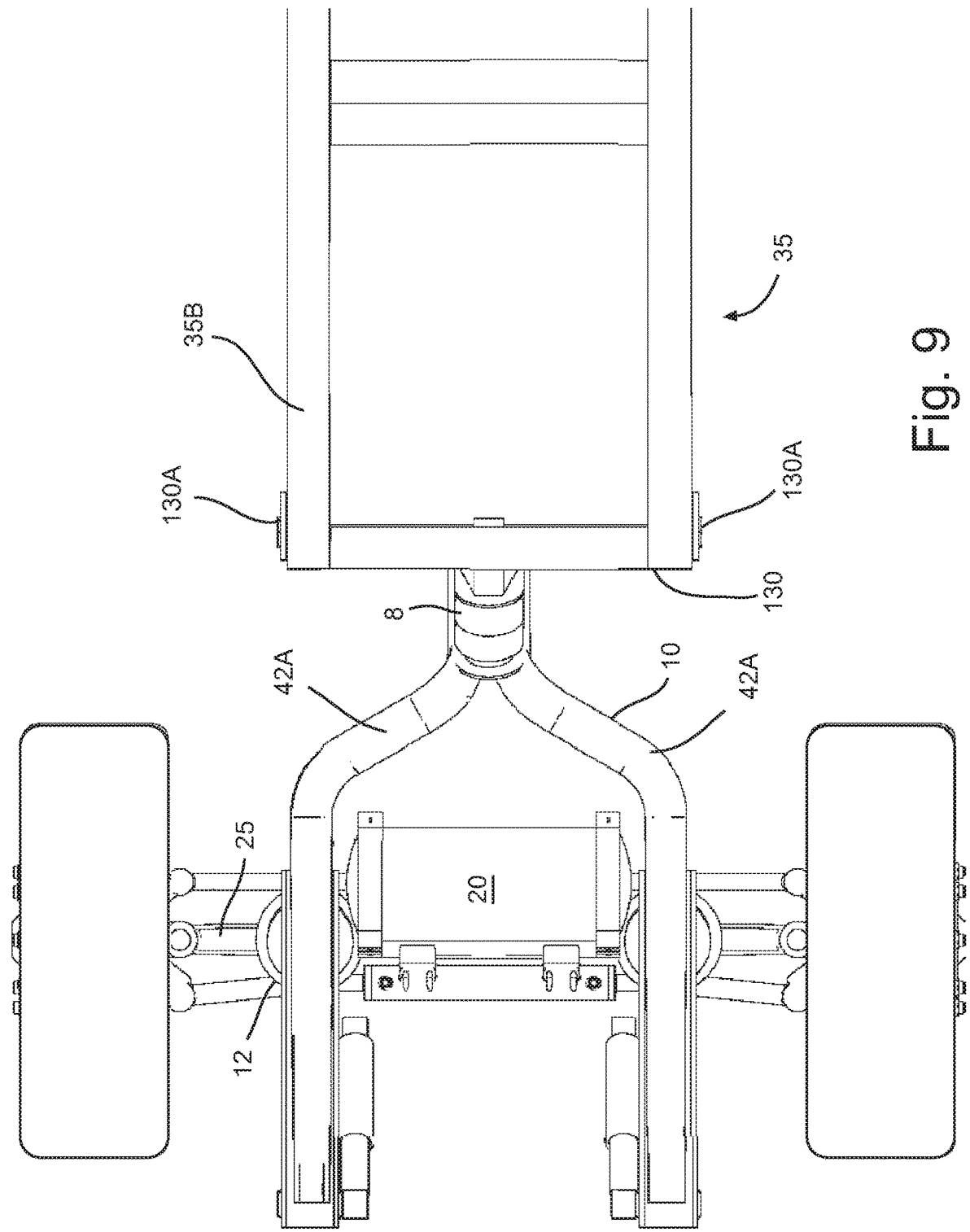
FIG. 9 is a top plan view of the load divider dolly and a rear portion of the tow vehicle of FIG. 8.
Figure 10:
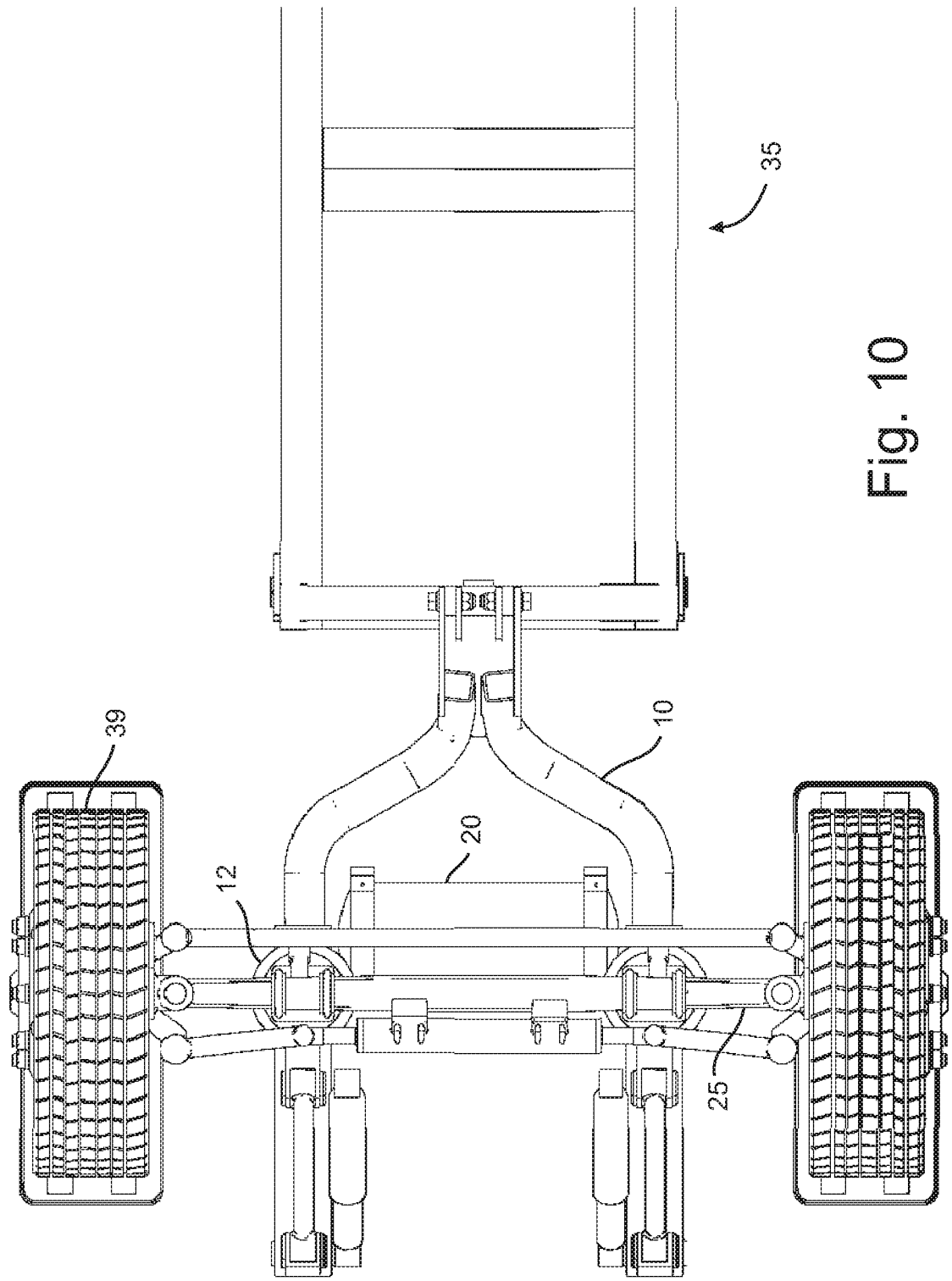
FIG. 10 is a bottom plan view of the load divider dolly and a rear portion of the tow vehicle of FIG. 8.
Figure 11:
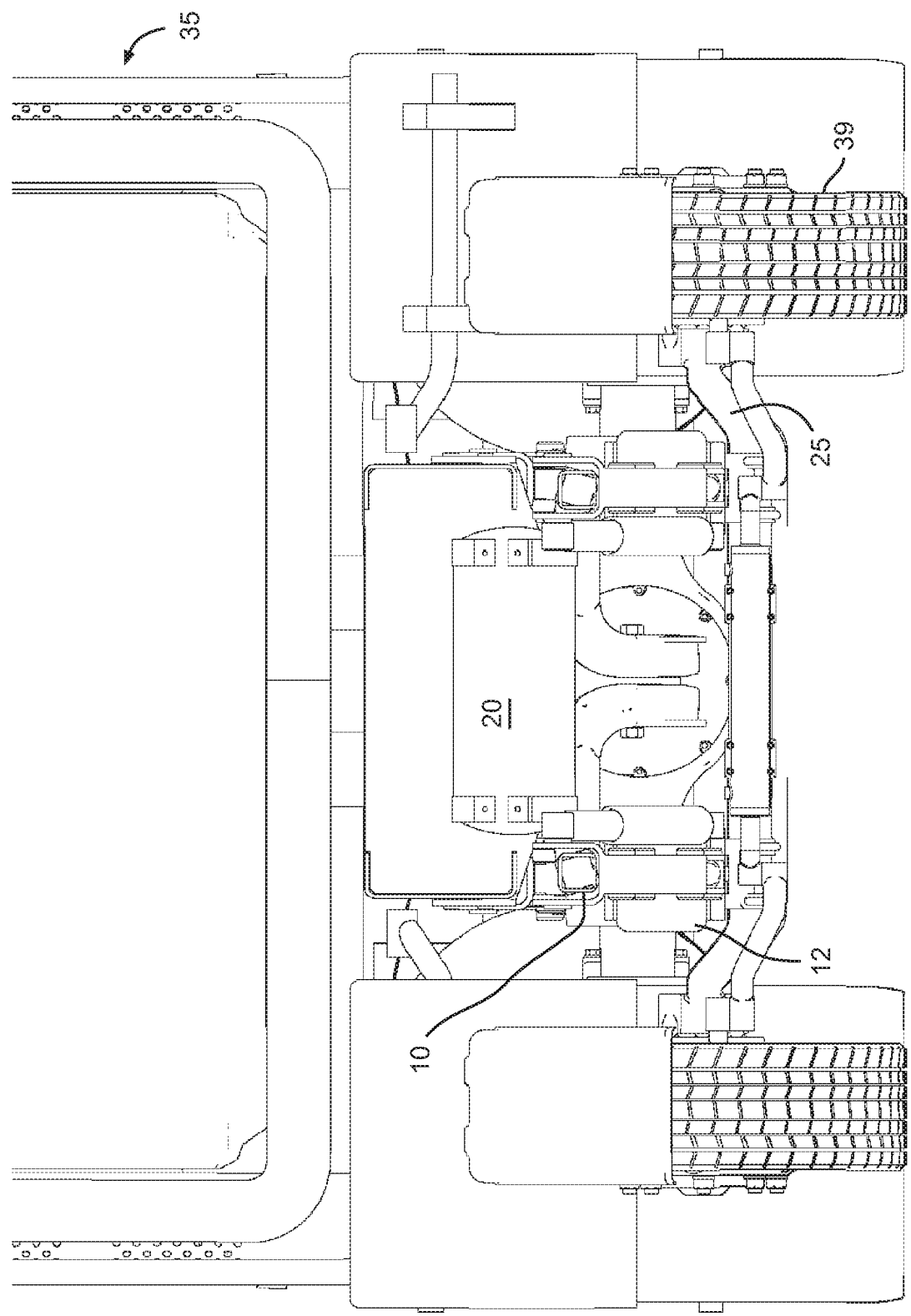
FIG. 11 is a rear end view of the load divider dolly and a rear portion of the tow vehicle of FIG. 8.
Figure 12:
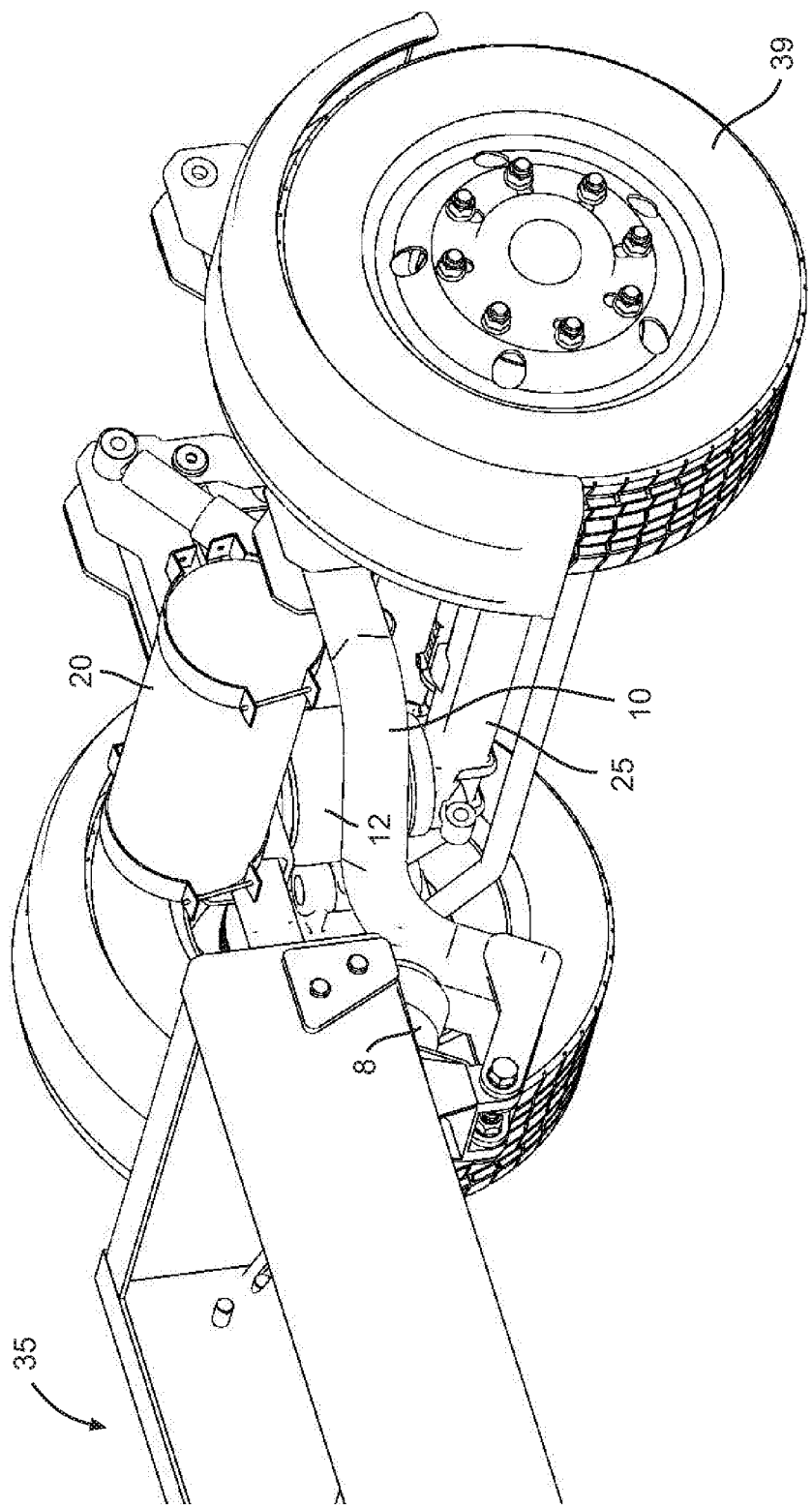
FIG. 12 is a front perspective view of the load divider dolly and a rear portion of the tow vehicle of FIG. 8.
Figure 13:
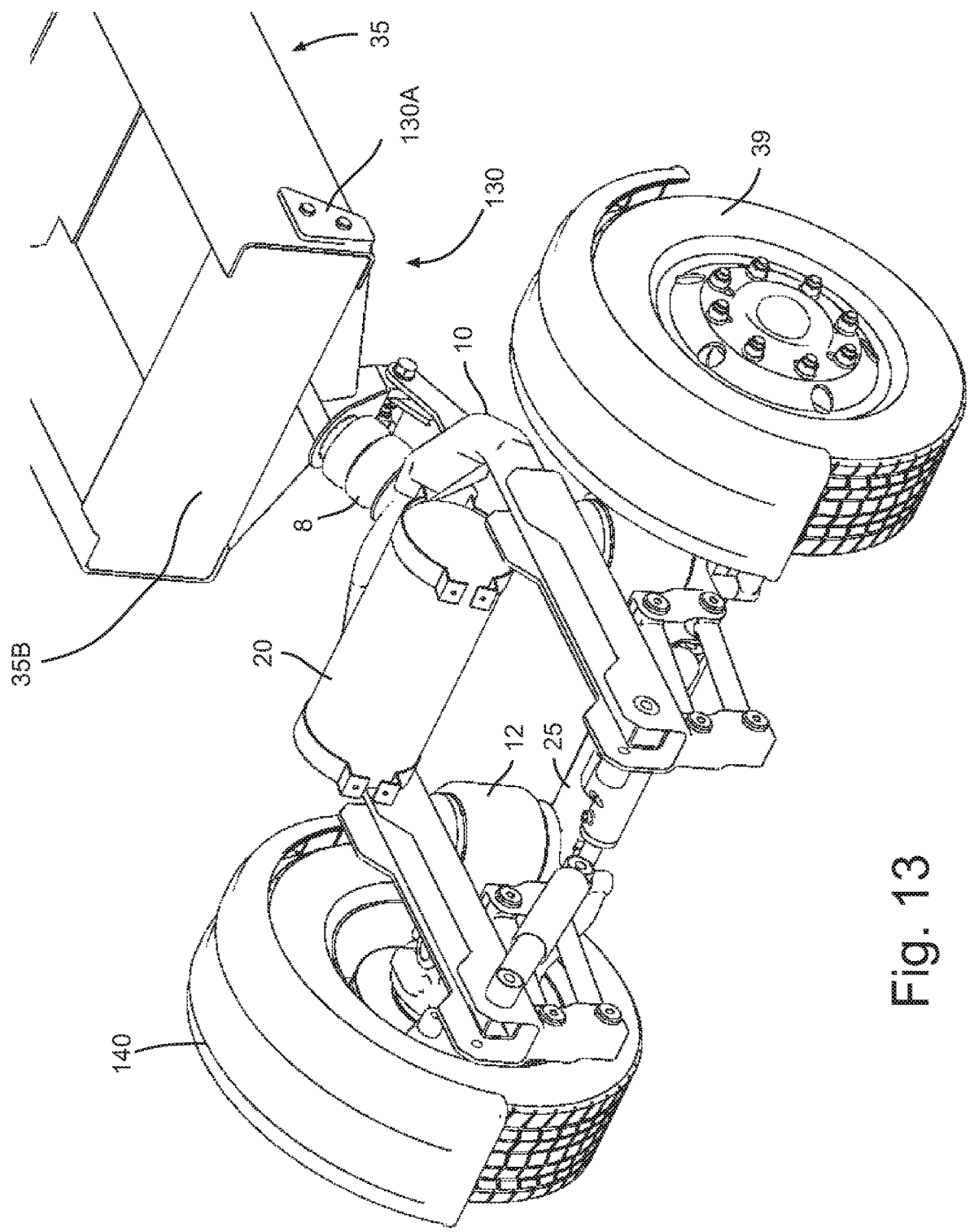
FIG. 13 is a rear perspective view of the load divider dolly and a rear portion of the tow vehicle of FIG. 8.
Figure 14:
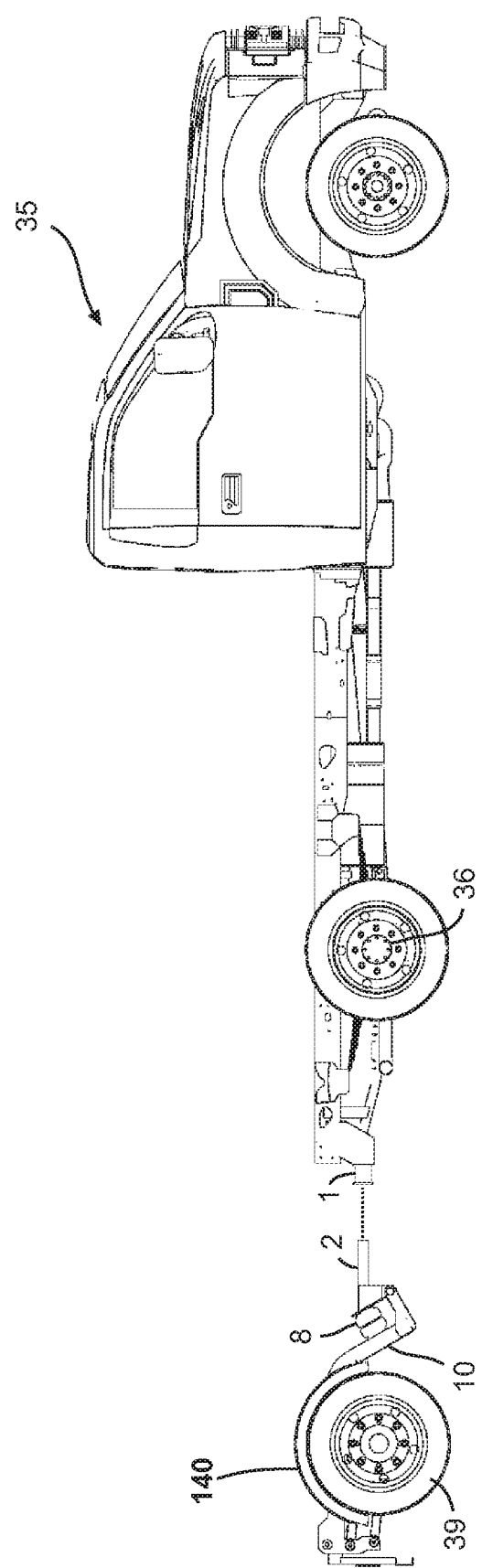
FIG. 14 is a side elevation partially exploded view of a load divider dolly and a tow vehicle, in this case a pickup truck, illustrating a hitch connection between the load divider dolly and the tow vehicle.
Figure 15:
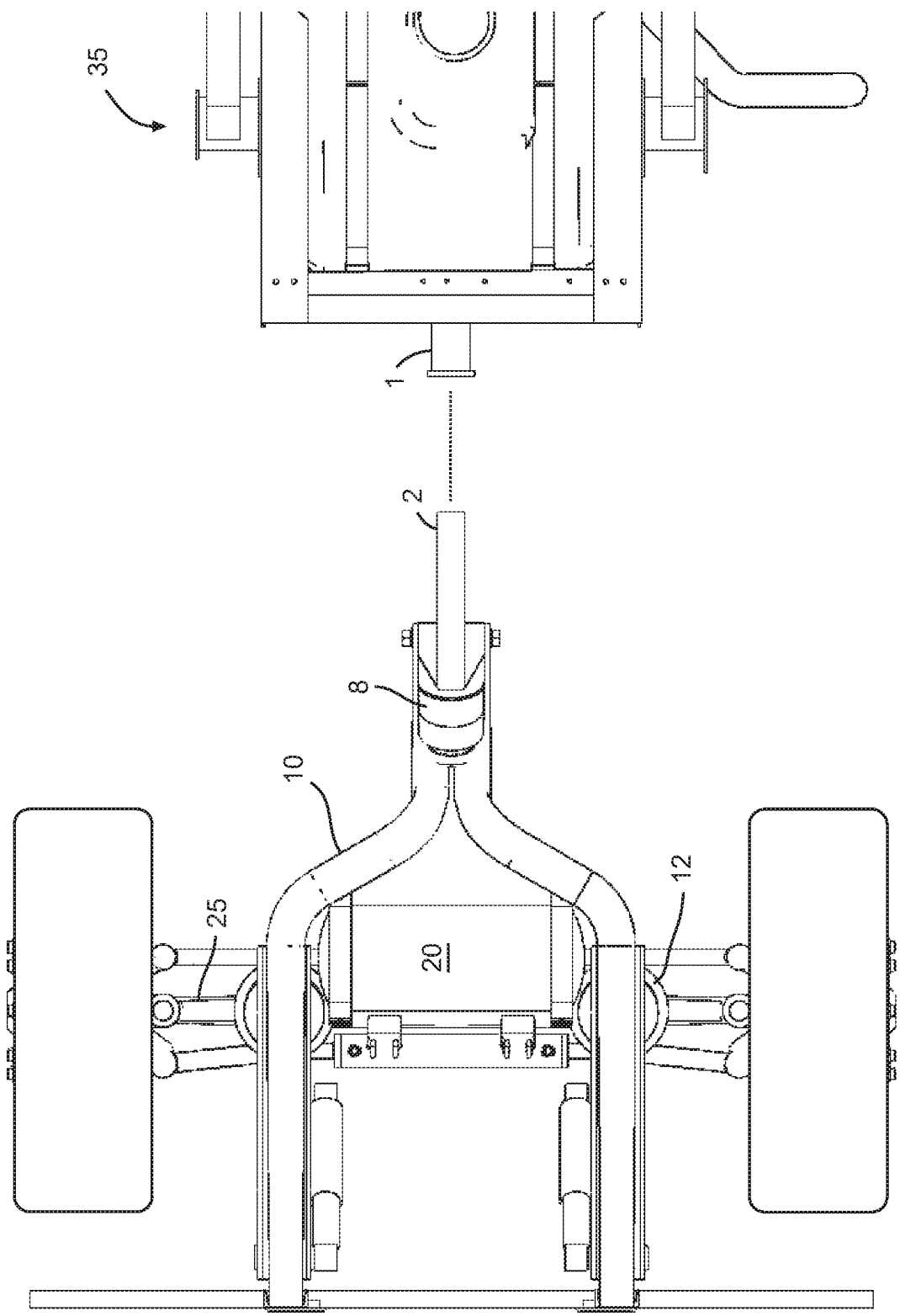
FIG. 15 is a top plan view of the load divider dolly and a rear portion of the tow vehicle of FIG. 14.
Figure 16:
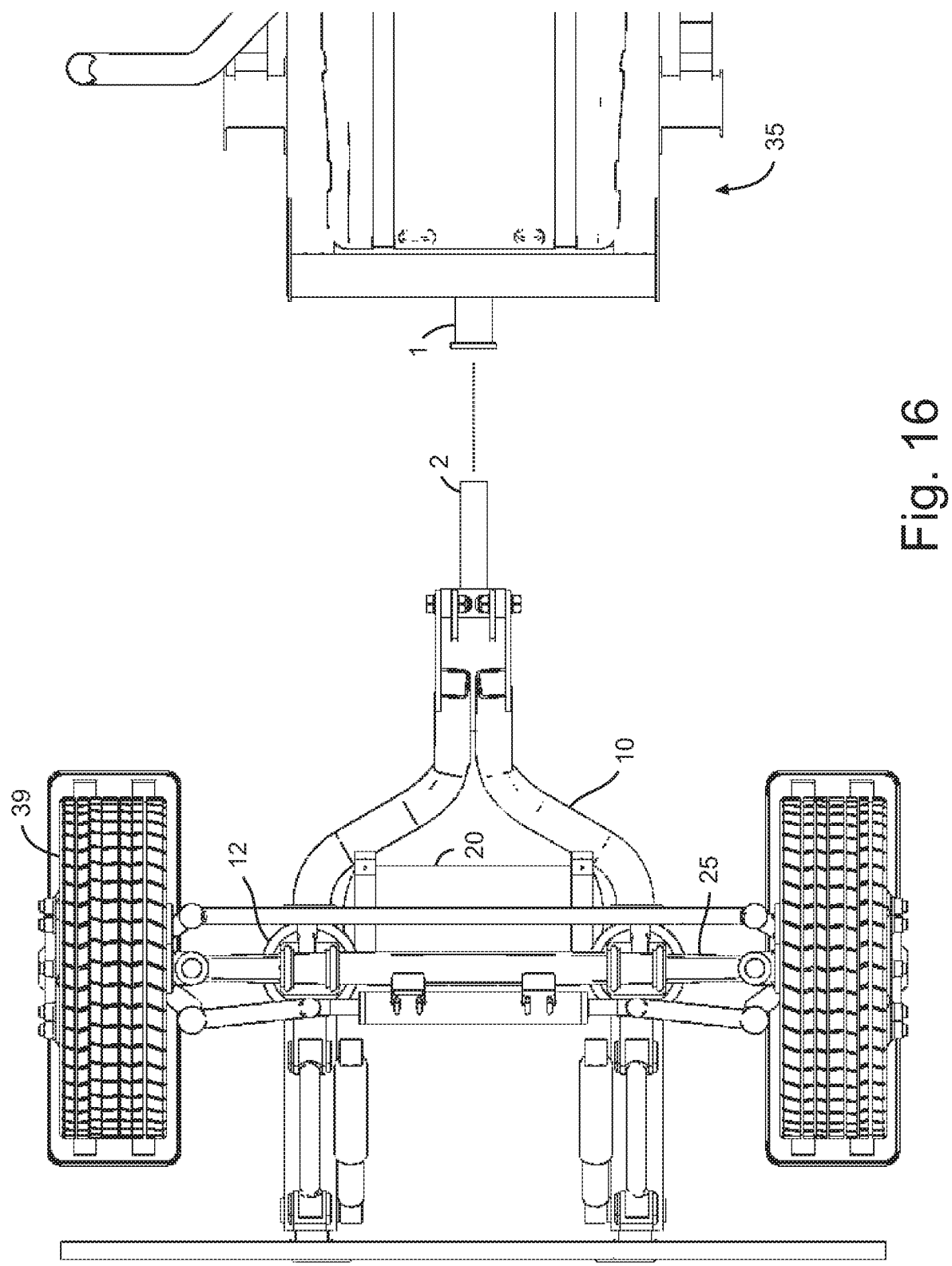
FIG. 16 is a bottom plan view of the load divider dolly and a rear portion of the tow vehicle of FIG. 14.
Figure 17:
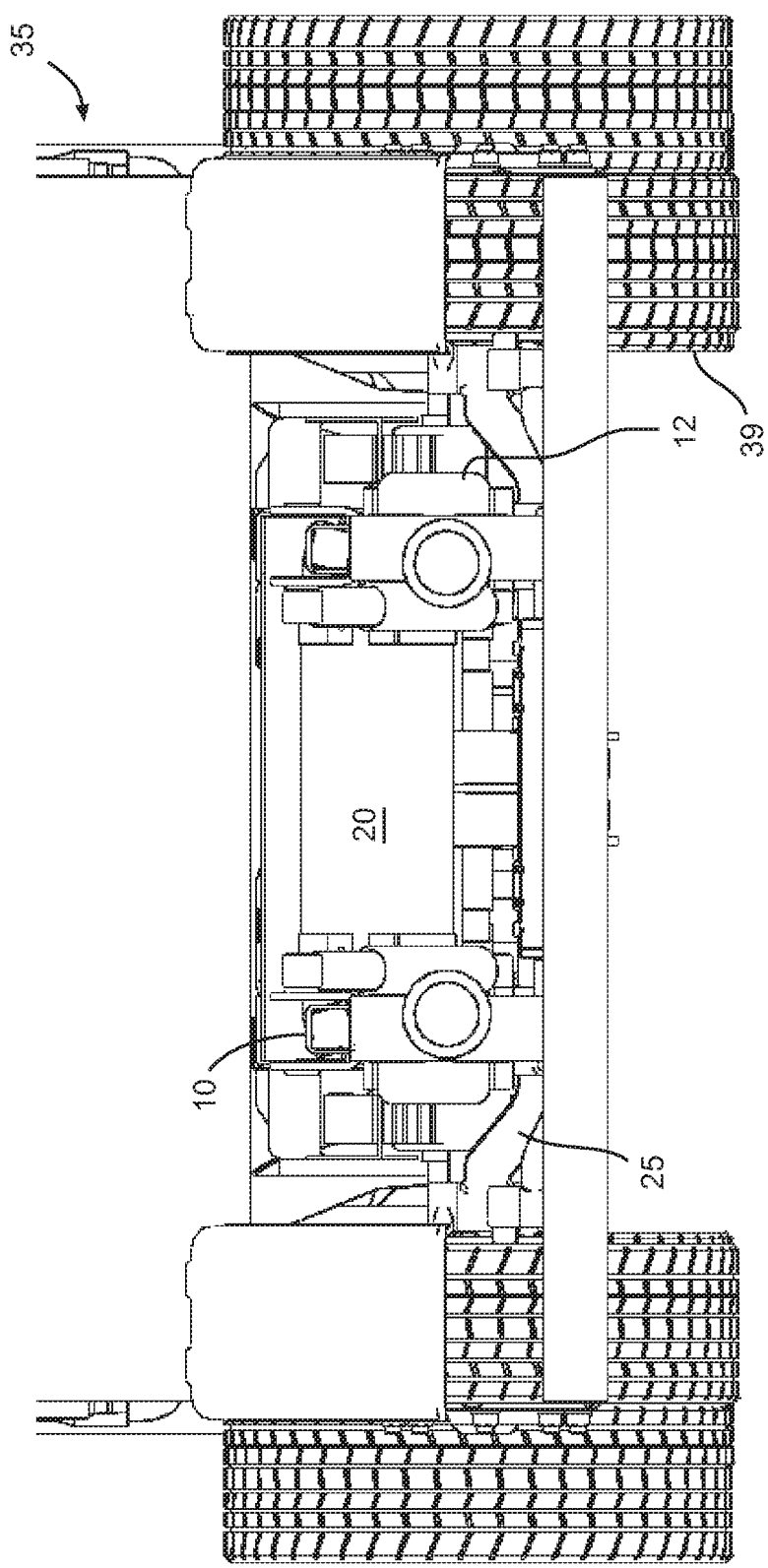
FIG. 17 is a rear end view of the load divider dolly and a rear portion of the tow vehicle of FIG. 14.
Figure 18:
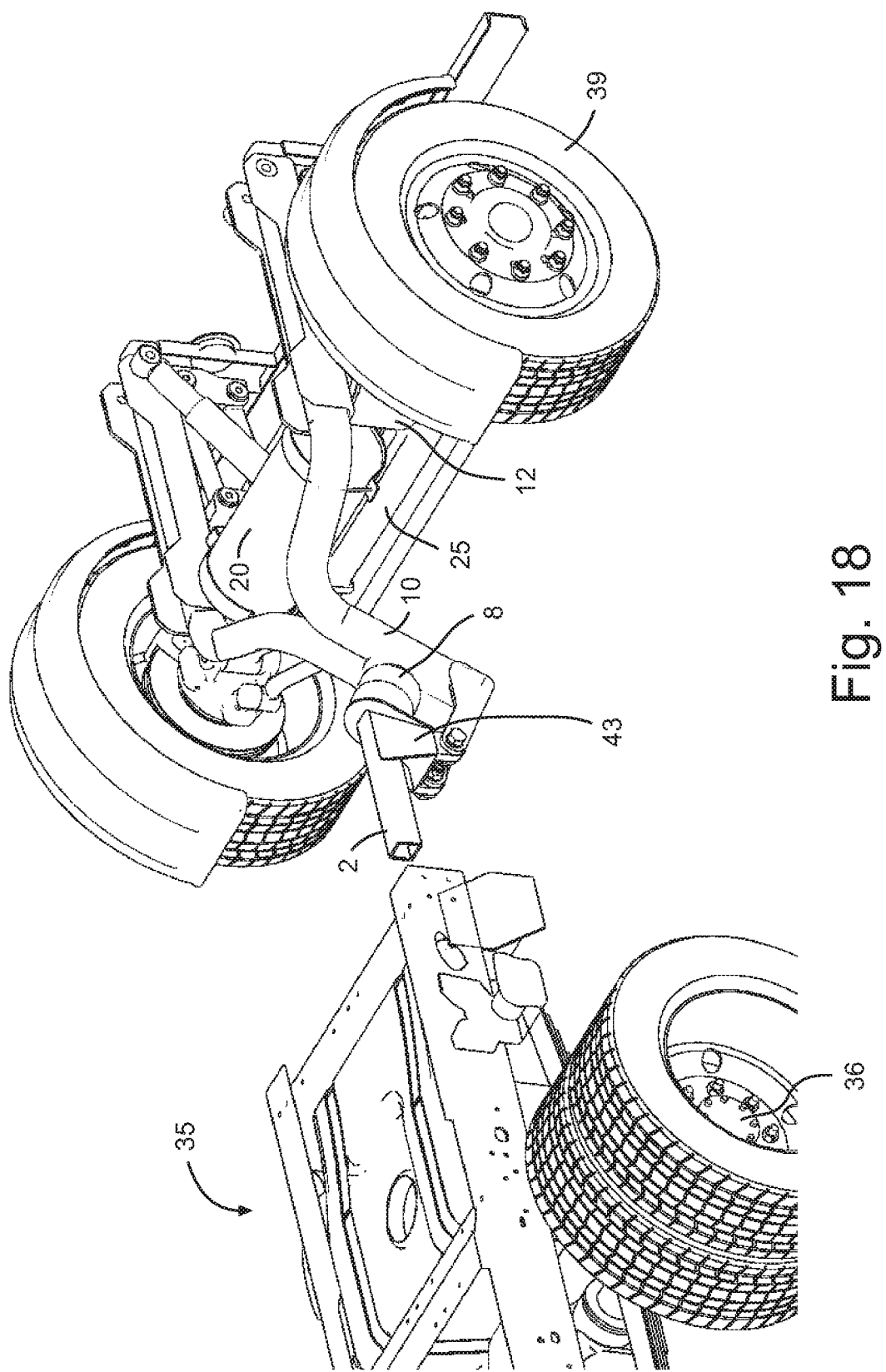
FIG. 18 is a front perspective view of the load divider dolly and a rear portion of the tow vehicle of FIG. 14.
Figure 19:
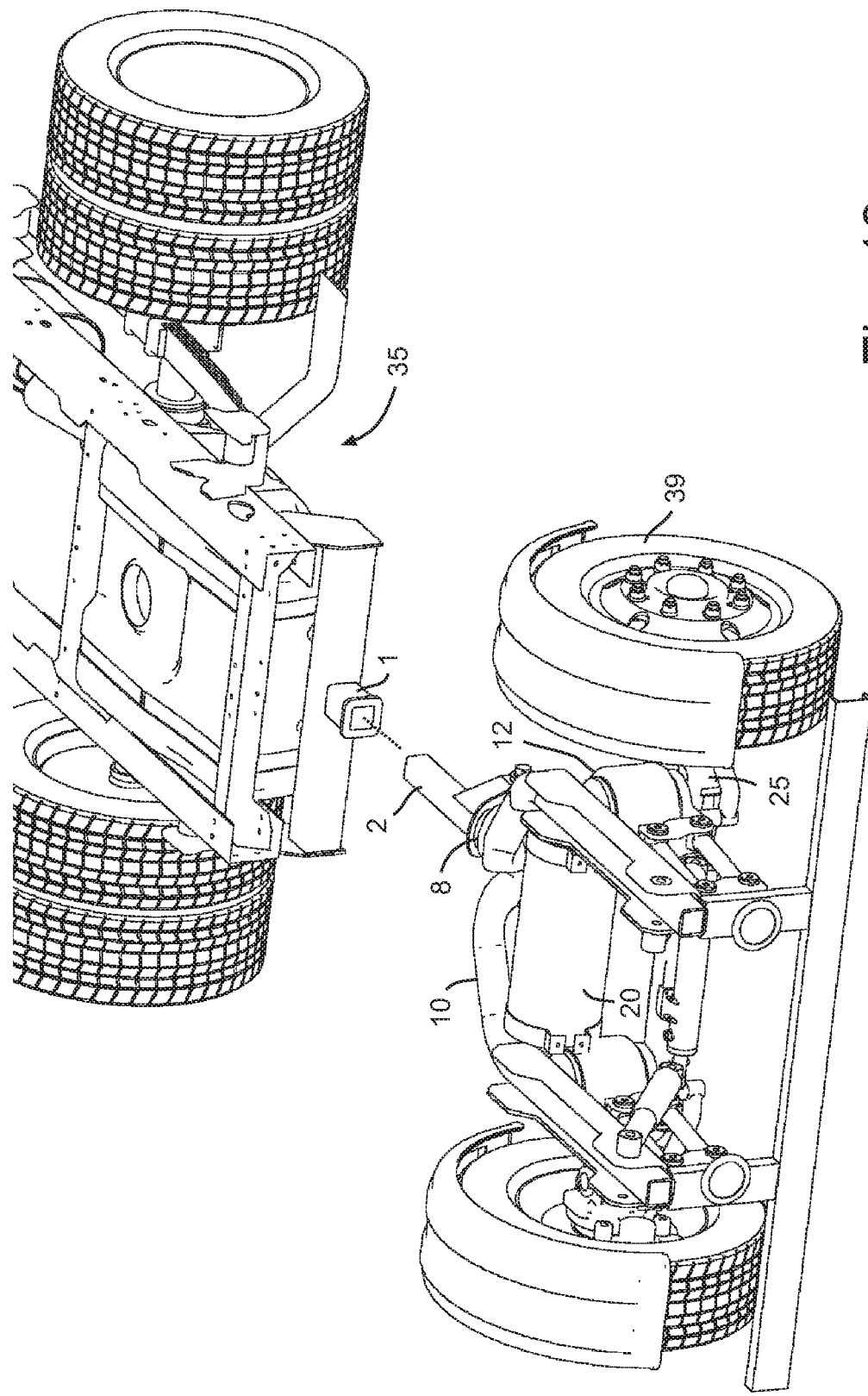
FIG. 19 is a rear perspective view of the load divider dolly and a rear portion of the tow vehicle of FIG. 14.

Referring to FIGS. 6 and 7, the tow vehicle mount 43 may have a suitable form for mounting to the tow vehicle 35. Connecting the mount 43 to the vehicle 35 may form part of a method of retrofitting a vehicle 35 with the dolly 41. The mount 43 may comprise a hitch connector 59. The hitch connector 59 shown comprises a box beam, such as insert 2, sized to be received within a tow bar or hitch receiver 1. The load divider dolly 41 may comprise an adjustable height receiver insert 2 that may secure, for example bolt, to the load divider dolly hitch frame bracket 3 and may insert into the vehicle trailer hitch receiver 1. The insert 2 may be secured within receiver 1 via a pin 4 or other suitable locking method. Custom manufactured vehicle mounting brackets may be used for heavier weight application load divider dollies 41 (not shown in illustrations). Load divider dolly safety chains 5 may connect to safety chain eyelets 6 of the receiver 1 for redundant safety features. A hitch frame 7 may support the adjustable height insert bracket 3, and the load divider dolly frame pivot brackets 3. Referring to FIGS. 14-19, an embodiment of a dolly 41 for connecting to a light duty tow vehicle 35, such as a full-ton pickup truck, is illustrated with a hitch connector (a.k.a. hitch receiver insert 2). Referring to FIGS. 8-13 a further embodiment is illustrated of a dolly 41 for connecting to a heavy duty tow vehicle 35, such as a tractor truck for hauling semi-trailer or full trailer units. Referring to FIGS. 9 and 13, in the example shown mount 43 may secure to vehicle 35 via a vehicle chassis connector 130, such as comprising side plates 130A defining a chassis receiver. Plates 130A may fasten, for example bolt, to end beam 35B of vehicle 35. Other methods may be used of mounting dolly 41 to vehicle 35, for example welding the mount 43 to the vehicle 35.

Referring to FIGS. 5-7, the load divider dolly 41 may comprise a shock absorber mounted between the chassis 42 and the ground engaging wheels 39. A pressure in the shock absorber may be maintained by the pressure control system 50. For example, air tank 20 may feed suspension air bags 12, via line 160 through ride height control valve 14. Valve 14 may be operated by ride height control linkage 38 or another suitable method. Other forms of shock absorbers may be used, including shock absorbers 13 (FIG. 6).

Figure 23:
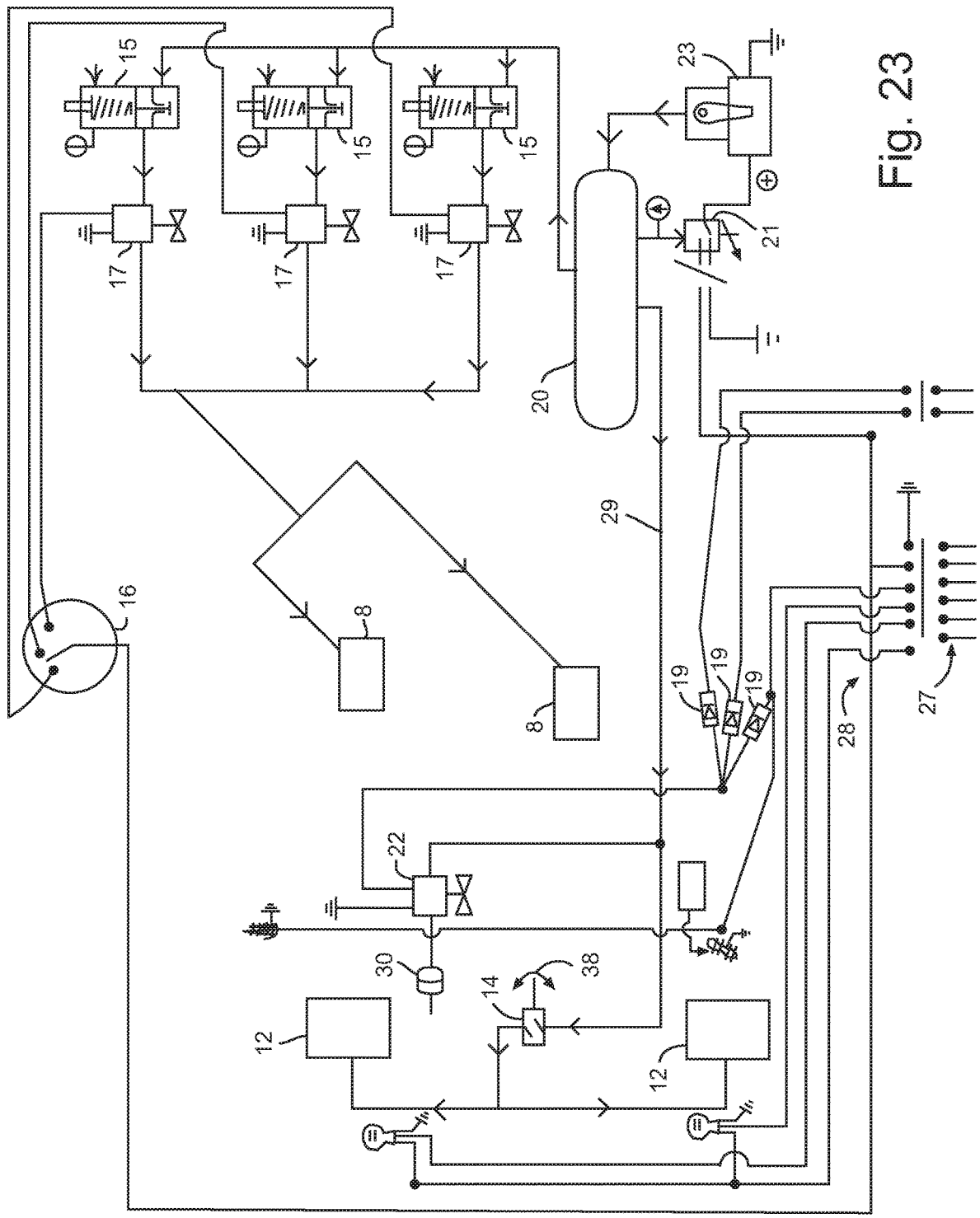
FIG. 23 is a schematic diagram of an embodiment of a pressure control system configured to regulate air pressure in a variable volume element.

Referring to FIGS. 5-7, the variable volume element 8, for example comprising the weight maintenance air bags, may be mounted to one or more of the load divider dolly frame cross member 9 and the load divider dolly hitch frame 7. Referring to FIG. 23, the air bags may maintain or keep a constant pressure on the load divider dolly hitch frame 7, for example by supplying a preset air pressure to the air bags through a preset air pressure regulator system (weight maintenance air bag regulators 15, weight maintenance regulator selection switch 16, weight maintenance regulator selection solenoids 17, and in some cases one-way air check valves (not shown)) of the pressure control system 50. The air bag regulator system (15, 16, 17) may have a variety of settings that may be controlled by the operator to suit many different weights with the switch 16, which may be a cab mounted control device 128 (not shown). Each regulator setting may notify the operator as to which setting is appropriate for the weight or load that is being carried, for example by exhausting through the air regulator system (15) at each adjustment till it will no longer exhaust the air. This air pressure regulator system (15, 16, 17) may allow the operator to decrease the weight being carried since it would constantly exhaust when the maximum weight allowable for each load divider dolly carrying capacity is achieved. Components 15, 16, and 17 are an alternative form of providing system 50. Each regulator 15 may be pre-set to a different pressure, such as 15, 25, and 35 psi in one example. Thus, a user may operate switch 16 to select the regulator 15 corresponding to 15 psi, and upon selection the respective solenoid 17 opens to allow the element 8 to pressurize to 15 psi. Upon the pressure in element 8 rising above the 15 psi set point, the respective regulator 15 will exhaust to 15 psi. The lowest regulator setting may correspond to an empty load mode, but if a load is present the user may select a higher pressure regulator. Thus, a user may use switch 16 to select the 25 or 35 psi regulator 15 as required, and upon selection, the respective solenoid 17 opens while the other solenoids close or remain closed, and the respective active regulator 15 thereafter maintains the desired pressure in the elements 8. In some cases more than regulator 15 may act together, for example if the pressure settings on the regulators 15 are adjustable or if plural regulators 15 are provided for redundancy in case one fails.

Referring to FIGS. 5-7, air for the load divider system may be supplied from the mounted air tank 20 that is supplied air from an air compressor 23, for example a 12-volt air compressor. The compressor 23 may receive the 12-volt power from an electrical power outlet of the tow vehicle 35, for example through the load divider's electrical harness 28, which may be connected to the vehicle's electrical trailer plug supply receptacle 27. The air compressor 23 may be controlled by an electrical air pressure switch 21 to regulate the air pressure in the air tank 20. As the height of load divider dolly axle 25 becomes lower than the rear axle 36 of the tow vehicle 35, the load divider dolly frame member 9 may pivot at the pitch axis 47 and increase the distance between the axle frame weight maintenance air bag mount cross member 9 and the load divider dolly's hitch frame 7 air bag mounts. A weight maintenance air regulator system (15, 16, 17) may supply the increased air volume needed to maintain the constant air pressure needed in the air bags to maintain a constant weight carrying pressure to the tow vehicle's hitch (01) allowing the tow vehicle's axles 36 to keep a consistent weight. This may prevent the tow vehicle's axles 36 from overloading. As the elevation of the load divider dolly axle 25 and frame 10 become higher than that of the rear axle 36 of the tow vehicle 35, the load divider dolly frame 10 may pivot upward, decreasing the distance between the load divider dolly frame 10 and the load divider dolly hitch frame 7 and the air pressure in the air bags may increase past the preset pressure in the air pressure regulator system (15, 16, 17) and this system will allow the increased pressure to exhaust out the regulators till the pre-set pressure is achieved to maintain the constant pressure needed to maintain the constant weight on each of the axles 36. Once the pressure is at its preset pressure required the regulator system (15, 16, 17) will no longer exhaust the air and maintain the pressure needed to support the loads.

Referring to FIGS. 5-7 the regulator system 50 may comprise preset air pressure regulators 53, for example that receive air pressure from the mounted air tank 20. Each air pressure regulator (53) may be connected to a respective electric air solenoid 17, for example that is controlled by the operator via the selection switch 16. Each electric air solenoid 17 may have its own separate one-way check valve (not shown) in the outlet port so that when the operator selects a specific position on the switch 16 the air from the higher-pressure regulator will not back leak to the lower pressure regulator. As the load increases on the weight maintenance air bags past the preset pressure it may exhaust the excess pressure out the exhaust port of the selected air pressure regulator. At such point the exhaust is a warning of over load for that regulator and the operator may select the next preset regulator till the maximum pressures for the load on the tow vehicle 35 are reached. If it continues to exhaust out the exhaust ports on the last selection of the regulators it may warn the operator that the carrying load is too much and will have to be lessened. In such a fashion the load set point may be manually set, for example to one of three or more presets.

Referring to FIGS. 5-7, the wheels 39 may be steerable. Radius torque arm brackets 11 may be provided as a weight transfer maintenance air bag mount. A self-steerable axle frame assembly may be permanently attached to pivot brackets of the hitch frame 7 with pins for example to permit the self-steerable axle frame 10 to flex while ground elevations change between the two vehicles rear axle 36 and the load divider dolly axle 25. The self-steer axle 25 may be attached to the load divider dolly frame 10 with two or other suitable numbers of adjustable radius rods 34 on each side of the steerable axle 25 from the load divider dolly hitch frame 7 to the radius rod brackets X on the self-steer axle 25. This 4-point connection may permit the steerable axle 25 to maintain the castor of the kingpins, for example to remain at the proper castor while the axle 25 raises or lowers from the ground elevations. This may prevent the wheels of the axle 25 from oscillating as a result of castor angle changes. The frame 10 may support two or other suitable number of air springs or bags 12, for example that are mounted to the top bracket of the steerable axle 25. The air springs or bags 12 may be supplied air from the air tank 20. The distance between the axle 25 and the load divider frame 7 may be controlled by an air ride height control valve 14. The valve 14 may be supplied air from the air tank 20. The ride height valve 14 may be mounted to the frame 7 of the load divider dolly 41 and may be connected to the self-steer axle 25 via an adjustable rod 38. The ride height valve 14 may maintain a set distance between the self-steer axle 25 and the load divider frame 7. As the distance from the load divider dolly frame 7 and the self-steerable axle 25 decreases from the load applied to the self-steer axle 25, the preset linkage 38, which may be connected to the self-steerable axle 25 cross beam and the ride height control valve 14 arm, which may be permanently mounted at a set position on the load divider dolly's frame 7, may pivot upward, for example activating the ride height control valve 14 to supply air pressure to the self-steerable axle air bags 12. The valve 14 may supply air pressure, for example through air lines, from the air tank 20 until the distance from the self-steer axle 25 and the load divider frame 7 reach a preset height. At the preset height, the ride height control valve 14 may shut off the air supply from the air tank 20 and the proper load may be applied to the self-steerable axle 25. As the weight load on the self-steerable axle 25 decreases, the distance from the crossbeam of the self-steerable axle 25 and the tag axle frame 7 increases past the preset distance, the ride height control linkage 38 may pull the control arm on the ride height control valve 14 pivoting it downward and release air volume from the self-steerable axle air bags 12 through the air lines out the exhaust port of the ride height control valve 14. Such action may maintain a constant weight upon the self-steerable axle 25 and the wheels 39.

The wheels 39, for example steerable wheels, may connect to a tie rod 29, for example that maintains the same turning action on both wheels 39. As the tow vehicle 35 turns in any direction the self-steering axle 25 may force the wheels 39 to point in the direction of force. This action may eliminate scrubbing of the tires in the turn. The steering damper 26, for example connected to the tie rod 29 and the cross beam of the self-steer axle 25 may prevent oscillation of the wheels 39.

Referring to FIGS. 5-7 the steer lock mechanism may comprise an air chamber 30, for example with a push rod, a pivoting lock mechanism 31 and a lock receiver 32, for example permanently attached to the center of the tie rod 29. Such may lock the steer axle tires/wheels 39 in a straight position while reversing the vehicle 35 or on severe slippery roads. The locking mechanism air chamber 30 would also receive air supply from the air tank 20. Air supply of the locking air chamber 30 may be controlled by an air solenoid. The electric air solenoid 12-volts may supply from the tow vehicle by the following means or other suitable means: 1) by the reverse light switch to lock the axle in a straight position while reversing the vehicle; 2) from a manual switch that is in the cab area of the tow vehicle that can be controlled by the operator if the ground surface becomes to slippery due to mud or ice at which time tire scrubbing is not a major concern; and 3) from the brake light switch to activate the locking mechanism on braking applications so the wheels 39 will not oscillate on braking applications. Such wires may be connected to the tow vehicle 35 through the load divider dolly wiring harness 28 and the trailer plug receptacle 27. Each wire may have an in line one-way diode 19, for example to prevent the 12-volts to back feed to the wires not in use at the time of application. As the air may be needed for the lock air chamber 30 the solenoid may be activated by the appropriate switches and air may be supplied to the air chamber. As air is applied to the chamber 30, the rod may be pushed outward and actuating the pivoting lock mechanism 31 into the slotted tie rod lock plate or receiver 32. Each wheel 39 on the self-steerable axle 25 may be equipped with a brake assembly 40, for example with brake and/or signal lights 134. The assemblies 40 may be controlled by an electric brake controller via the electrical receptacle 27 and the wiring harness 28.

Referring to FIGS. 8-13, another embodiment of a dolly 41 is illustrated. Referring to FIG. 9, the chassis 42 may comprise a pair of arms 42A forming a fork structure. Spanning arms 42A is the air tank 20, axle and other suitable components. Fenders 140 may be present to protect wheels 39. Referring to FIGS. 9-19, a further embodiment is illustrated. The mount 43 may be rigidly connected to the vehicle 35, to permit inflation and deflation of element 8 to act upon and modify the pitch angle between chassis 42 and vehicle 35.

The load divider dolly may be equipped with proper Federal lighting requirements which are also controlled by the tow vehicle's electrical system and connected to the tow vehicles electrical receptacle plug. Air may be supplied through suitable connections such as ⅜ SYNFLEX™ line and connected with brass fittings at all components requiring air supply.

In some cases the control system 50 may set the load point on the fly without user input. For example, load sensors may be present on the tow vehicle's wheel axles, for example the rearward most ale, as well as on the axle 25 mounting wheels 39 of dolly 41. The system 50 may analyze load distribution and adjust pressure in element 8 accordingly. For example, a predetermined load distribution may be used, for example if vehicle 35 has three axles and dolly 41 has one, then the control system 50 may be set to balance load so dolly 41 carries ¼ of the load. Set points may be set on other than horizontal surfaces, for example if the system 50 incorporates a level sensor, and adjusts the set point by extrapolating the position sensor signals with the level readings to determine where the set point would be if the vehicle 35 and dolly 41 were on horizontal level ground.

In some cases a self-steer air ride light duty load divider dolly (de-tachable) is disclosed. A purpose of some embodiments is to increase the light duty vehicle's ability to carry heavier loads, such as a camper or load of gravel. Pressure adjustments occur while wheels 39 are on the ground.

Unlike conventional load increasing methods such as air bag kits or over load springs, this method transfers the extra weight through the appropriate weight limit trailer hitch receiver that when it is connected to the vehicle's frame and transferred though the load divider dolly attachments frame assembly and the additional weight load is carried by the wheels on the additional axle. This document would also maintain the vehicle to its manufactures specifications while carrying extreme load weights. Air or other gas suspension may comprise a gas filled bladder, which could comprise a gas-receiving receptacle that permits the receipt and use of air, nitrogen, helium, or other suitable compressible gases.

The dolly 41 may be detachable. In some cases the load dividing air bag system 50 operates more smoothly and responsively than could a hydraulic system, with less stress impact. Pressure can be adjusted continuously and seamlessly with a compressor. Passive systems that use an accumulator, may dampen shock and pitch up and down, but are less responsive and in the case of moving to expand the bag, useless in dividing load. Accumulators may also present safety hazards due the relatively high pressure and volume of gas required to be continuously stored in the unit, in addition to the practical constraints on such systems.

An incomplete list of parts include:
1—Tow Vehicle Trailer hitch receiver
2—Load divider dolly adjustable receiver insert
3—Load divider dolly adjustable insert bracket
4—Receiver insert lock pin
5—Load divider dolly safety chain (2)
6—Tow vehicle safety chain eyelets (2)
7—Load divider dolly hitch frame
8—Load divider weight maintenance air bags (2)

9—Load divider dolly frame weight maintenance air bag cross member
10—Self-steerable axle frame assembly
11—Axle frame pivot brackets and adjustable radius torque arm brackets (2)
12—Steerable axle air bags (2)
13—Shock absorbers and brackets (2)
14—Ride height control
15—Weight maintenance air bag regulators
16—Weight maintenance regulator selection switch
17—Weight maintenance regulator selection solenoids
18—One-way air check valves
19—One-way electrical diodes
20—Mounted air tank
21—Electric air pressure switch
22—Axle lock chamber air solenoid
23—12-volt air compressor
24—⅜-inch Synflex air line
25—Steerable straight axle
26—Steering damper
27—Tow vehicle electrical power supply receptacles
28—Load divider dolly electrical power supply harness and plugs
29—Tie rod
30—Steering lock air chamber and push rod
31—Steering lock pivot mechanism
32—Tie rod steering lock slotted plate
33—Steerable axle adjustable radius arm bracket (2)
34—Adjustable radius torque arm (4)
35—Tow vehicle
36—Tow vehicle axles
37—Load divider dolly axle shocks (2)
38—Ride height control linkage
39—Tag axle wheels (2)
40—Electric brake assembly (2)

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A load divider dolly comprising:
a chassis;
ground engaging wheels;
a tow vehicle mount pivotally mounted to the chassis;
a variable volume element mounted to adjust a pitch angle between the chassis and the tow vehicle mount; and
a pressure control system configured to, during use, supply and exhaust gas to and from the variable volume element to distribute load between a tow vehicle and the ground engaging wheels of the load divider dolly;
in which the pressure control system is configured to maintain, during use, a pressure in the variable volume element within a predetermined range by reducing and increasing the pressure in the variable volume element when the pressure in the variable volume element is above or below the predetermined range, respectively;
in which the pressure control system is configured to adjust the predetermined range during use;
in which the pressure control system is configured to set the predetermined range based on the variable volume element being in a neutral intermediate expansion state; and
further comprising a position sensor, which is connected to the pressure control system and configured to detect the neutral intermediate expansion state; in which:
the position sensor comprises a pitch angle sensor; and
the variable volume element is mounted between planar surfaces, with one of the planar surfaces forming part of the tow vehicle mount and another of the planar surfaces forming part of the chassis.

2. The load divider dolly of claim 1 in which the pressure control system is configured to set the predetermined range based on a load carried by the tow vehicle.

3. The load divider dolly of claim 1 further comprising a control device configured to be operated by a user to instruct the pressure control system to set the predetermined range.

4. The load divider dolly of claim 3 in which the control device is mounted within a cab of a tow vehicle connected to tow the load divider dolly.

5. The load divider dolly of claim 1 further comprising a pressure sensor, which is connected to the pressure control system and configured to detect pressure in the variable volume element.

6. The load divider of claim 1 in which:
the variable volume element comprises a gas-filled bag; and
the gas-filled bag comprises an air bag.

7. The load divider dolly of claim 6 further comprising an air compressor and an air tank connected to supply air pressure to the variable volume element.

8. The load divider dolly of claim 6 in which the pressure control system is configured to at least partially exhaust pressure from the variable volume element to the atmosphere to reduce pressure in the variable volume element.

9. The load divider dolly of claim 1 in which the tow vehicle mount comprises a hitch connector.

10. An apparatus comprising:
a tow vehicle; and
the load divider dolly of claim 1 connected to the tow vehicle.

11. A method comprising:
advancing a tow vehicle over a ground surface, in which a load divider dolly is connected to a rear end of the tow vehicle, the load divider dolly having:
a chassis pivotally mounted to the tow vehicle;
a variable volume element mounted to adjust a pitch angle between the chassis and the tow vehicle; and
wheels mounted to the chassis and engaging the ground surface;
while advancing the tow vehicle, supplying and exhausting gas to the variable volume element to distribute load between a tow vehicle and the ground engaging wheels of the load divider dolly;
in which supplying and exhausting gas to the variable volume element further comprises:
exhausting gas from the variable volume element while the load divider dolly and tow vehicle traverse a section of ground surface corresponding to a positive rate of slope change; and
supplying gas to the variable volume element while the load divider dolly and tow vehicle traverse a section of ground surface corresponding to a negative rate of slope change.

12. The method of claim 11 in which supplying and exhausting gas to the variable volume element further comprises maintaining, during use, a pressure in the variable volume element within a predetermined range.

13. The method of claim 12 further comprising setting the predetermined range corresponding to the variable volume element having a neutral intermediate expansion state while the load divider dolly and tow vehicle are on a horizontal ground surface.

* * * * *